(12) United States Patent
Iwanami

(10) Patent No.: US 11,341,468 B2
(45) Date of Patent: May 24, 2022

(54) CLIENT DEVICE, INFORMATION PROCESSING SYSTEM, STORAGE MEDIUM, AND INFORMATION PROCESSING METHOD

(71) Applicant: SONY CORPORATION, Tokyo (JP)

(72) Inventor: Hiroshi Iwanami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 102 days.

(21) Appl. No.: 16/480,156

(22) PCT Filed: Dec. 11, 2017

(86) PCT No.: PCT/JP2017/044274
§ 371 (c)(1),
(2) Date: Jul. 23, 2019

(87) PCT Pub. No.: WO2018/146936
PCT Pub. Date: Aug. 16, 2018

(65) Prior Publication Data
US 2019/0370761 A1 Dec. 5, 2019

(30) Foreign Application Priority Data

Feb. 13, 2017 (JP) .............................. JP2017-023785

(51) Int. Cl.
*G06Q 20/06* (2012.01)
*G06Q 20/40* (2012.01)
(Continued)

(52) U.S. Cl.
CPC ........... *G06Q 20/065* (2013.01); *G06Q 20/40* (2013.01); *G10L 15/04* (2013.01); *G10L 15/07* (2013.01)

(58) Field of Classification Search
CPC .................................................. G06Q 20/065
See application file for complete search history.

(56) References Cited

U.S. PATENT DOCUMENTS 10,157,400 B1 * 12/2018 Georgi
2010/0115419 A1 5/2010 Mizuno
(Continued)

FOREIGN PATENT DOCUMENTS

| CN | 101669138 A | 3/2010 |
| JP | 2003-303279 A | 10/2003 |

(Continued)

OTHER PUBLICATIONS

Severo, et al., in "The Economy of the Digital Gift: From Socialism to Sociality Online," from Theory, Culture and Society, Jan. 2016 (Year: 2016).*

(Continued)

*Primary Examiner* — Olabode Akintola
*Assistant Examiner* — Brandon M Duck
(74) *Attorney, Agent, or Firm* — Chip Law Group

(57) ABSTRACT

To provide a client device, an information processing system, a storage medium, and an information processing method capable of distributing, to both parties, virtual currency that generates value through gratitude act. A client device including: a detection unit configured to detect an act of expressing gratitude by a user; a communication unit configured to transmit and receive at least a first portion of virtual currency; and a control unit configured to perform control, with recognition of an act of expressing gratitude by a first user on the basis of data detected, such that a certain amount corresponding to the act in virtual currency held by the first user is subtracted and a first portion of the certain amount of the virtual currency is managed as gratitude currency held by the first user, the control unit being configured to cause the communication unit to transmit peripherally a second portion of the certain amount of the virtual currency as information regarding gratitude reception currency, the control unit being configured to perform con- (Continued)

trol, with reception of information regarding gratitude reception currency after detection of an act of expressing gratitude by a second user on the basis of data detected, such that the gratitude reception currency indicated by the information regarding the gratitude reception currency is managed as gratitude reception currency held by the first user.

10 Claims, 18 Drawing Sheets

(51) Int. Cl.
    *G10L 15/04*     (2013.01)
    *G10L 15/07*     (2013.01)

(56) References Cited

U.S. PATENT DOCUMENTS

2012/0254312 A1* 10/2012 Patel
2013/0226694 A1* 8/2013 Boyd
2015/0213438 A1* 7/2015 Kramer
2016/0232480 A1* 8/2016 Erez
2016/0379638 A1* 12/2016 Basye
2019/0238488 A1* 8/2019 Peng

FOREIGN PATENT DOCUMENTS

| JP | 2013-109522 A | 6/2013 |
| WO | 2008/108000 A1 | 9/2008 |
| WO | 2016/178327 A1 | 11/2016 |

OTHER PUBLICATIONS

International Search Report and Written Opinion of PCT Application No. PCT/JP2017/044274, dated Mar. 13, 2018, 09 pages of ISRWO.

Office Action for JP Patent Application No. 2018-566780, dated Feb. 15, 2022, 02 pages of English Translation and 02 pages of Office Action.

* cited by examiner

FIG. 13
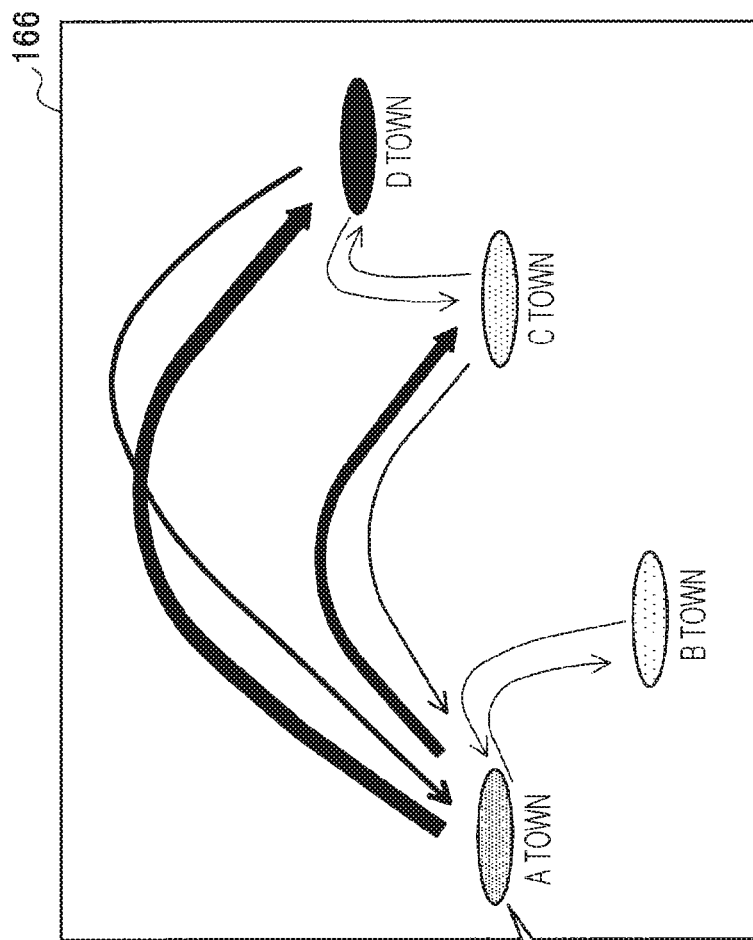
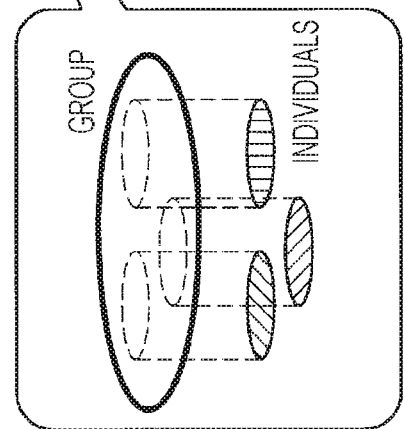

CLIENT DEVICE, INFORMATION PROCESSING SYSTEM, STORAGE MEDIUM, AND INFORMATION PROCESSING METHOD

CROSS REFERENCE TO RELATED APPLICATIONS

This application is a U.S. National Phase of International Patent Application No. PCT/JP2017/044274 filed on Dec. 11, 2017, which claims priority benefit of Japanese Patent Application No. JP 2017-023785 filed in the Japan Patent Office on Feb. 13, 2017. Each of the above-referenced applications is hereby incorporated herein by reference in its entirety.

TECHNICAL FIELD

The present disclosure relates to a client device, an information processing system, a storage medium, and an information processing method.

BACKGROUND ART

Today's capitalist society continues to grow on the premise of a monetary economy; however, profit maximization has also raised disadvantages such as increase in the poor and regional disparities.

On the other hand, there is regional currency used as having the same value as legal currency or completely different value in a specific regional community. Efforts has been made to deepen regional revitalization and social interaction through such regional currency.

Moreover, in recent years, in order to stimulate communication and further improve society, a system has also been proposed in which the feeling of gratitude is quantified and used as currency, focusing on evaluating the feeling of gratitude to the other party.

For example, Patent Document 1 below discloses a technology related to a method of settlement of regional currency payment in a specific group. In particular, there is disclosed such a system capable of settling as regional currency like currency, with numerical evaluation value in which part or all of the value of offering of goods or services or donations among members in the specific group is replaced with a numerical value representing the degree of gratitude.

Furthermore, Patent Document 2 below discloses a system capable of expressing the feeling of gratitude of "thank you" as value information to a gift destination.

CITATION LIST

Patent Document

Patent Document 1: Japanese Patent Application Laid-Open No. 2003-303279
Patent Document 2: International Publication No. 2008/108000

SUMMARY OF THE INVENTION

Problems to be Solved by the Invention

Both of the systems, however, unilaterally give currency to the other party with the feeling of gratitude evaluated.

Thus, the present disclosure proposes a client device, an information processing system, a storage medium, and an information processing method capable of distributing, to both parties, virtual currency that generates value through a gratitude act.

Solutions to Problems

According to the present disclosure, there is proposed a client device including: a detection unit configured to detect an act of expressing gratitude by a user; a communication unit configured to transmit and receive at least a first portion of virtual currency; and a control unit configured to perform control, with recognition of an act of expressing gratitude by a first user on the basis of data detected by the detection unit, such that a certain amount corresponding to the act in virtual currency held by the first user is subtracted and a first portion of the certain amount of the virtual currency is managed as gratitude currency held by the first user, the control unit being configured to cause the communication unit to transmit peripherally a second portion of the certain amount of the virtual currency, as information regarding gratitude reception currency, the control unit being configured to perform control, with reception of information regarding gratitude reception currency via the communication unit after detection of an act of expressing gratitude by a second user on the basis of data detected by the detection unit, such that the gratitude reception currency indicated by the information regarding the gratitude reception currency is managed as gratitude reception currency held by the first user.

According to the present disclosure, there is proposed an information processing system, including: a storage unit configured to store an amount of currency held by a user, on a per-user basis; a communication unit configured to receive information based on data detected by a detection unit that detects an act of expressing gratitude by the user and information regarding the currency, together with a user ID; and a control unit configured to control the storage unit so as to manage a first portion of a certain amount of virtual currency as gratitude currency held by a first user, with subtraction of the certain amount corresponding to an act of expressing gratitude by the first user in the virtual currency held by the first user after recognition of the act corresponding to a first user ID, according to the information based on the data detected by the detection unit, received together with the first user ID, the control unit being configured to perform control to transmit, via the communication unit, an instruction signal for instructing a client device to peripherally transmit a second portion of the certain amount of the virtual currency as information regarding gratitude reception currency, the control unit being configured to further control the storage unit so as to manage for gratitude reception currency held by the first user, with reception of a notice indicating acquisition by the first user of a predetermined amount of gratitude reception currency, together with the first user ID from the communication unit, subsequently to recognition of an act of expressing gratitude by a second user not corresponding to the first user ID according to the information based on the data detected by the detection unit, received together with the first user ID.

According to the present disclosure, there is proposed a computer-readable storage medium storing a program for causing the computer to function as: a detection unit configured to detect an act of expressing gratitude by a user; a communication unit configured to transmit and receive at least a first portion of virtual currency; and a control unit configured to perform control, with recognition of an act of expressing gratitude by a first user on the basis of data detected by the detection unit, such that a certain amount corresponding to the act in virtual currency held by the first user is subtracted and a first portion of the certain amount of the virtual currency is managed as gratitude currency held by the first user, the control unit being configured to cause the communication unit to transmit peripherally a second portion of the certain amount of the virtual currency, as information regarding gratitude reception currency, the control unit being configured to perform control, with reception of information regarding gratitude reception currency via the communication unit after detection of an act of expressing gratitude by a second user on the basis of data detected by the detection unit, such that the gratitude reception currency indicated by the information regarding the gratitude reception currency is managed as gratitude reception currency held by the first user.

According to the present disclosure, there is proposed an information processing method, by a processor, including: storing an amount of currency held by a user, on a per-user basis, in a storage unit; receiving information based on data detected by a detection unit that detects an act of expressing gratitude by the user and information regarding the currency, together with a user ID, with a communication unit; and controlling the storage unit so as to manage a first portion of a certain amount of virtual currency as gratitude currency held by a first user, with subtraction of the certain amount corresponding to an act of expressing gratitude by the first user in the virtual currency held by the first user after recognition of the act corresponding to a first user ID, according to the information based on the data detected by the detection unit, received together with the first user ID, and performing control to transmit, via the communication unit, an instruction signal for instructing a client device to peripherally transmit a second portion of the certain amount of the virtual currency as information regarding gratitude reception currency; and further controlling the storage unit so as to manage for gratitude reception currency held by the first user, with reception of a notice indicating acquisition by the first user of a predetermined amount of gratitude reception currency, together with the first user ID from the communication unit, subsequently to recognition of an act of expressing gratitude by a second user not corresponding to the first user ID according to the information based on the data detected by the detection unit, received together with the first user ID.

Effects of the Invention

As described above, the present disclosure makes it possible to distribute, to both parties, virtual currency that generates value through a gratitude act.

Note that the above effect is not necessarily limited; and in addition to or instead of the above effect, there may also be exhibited any of effects indicated in the present specification or another effect that can be grasped from the present specification.

BRIEF DESCRIPTION OF DRAWINGS

FIG. 13 is an exemplary visualized graph for each entity according to the present embodiment.

MODE FOR CARRYING OUT THE INVENTION

Figure 1:
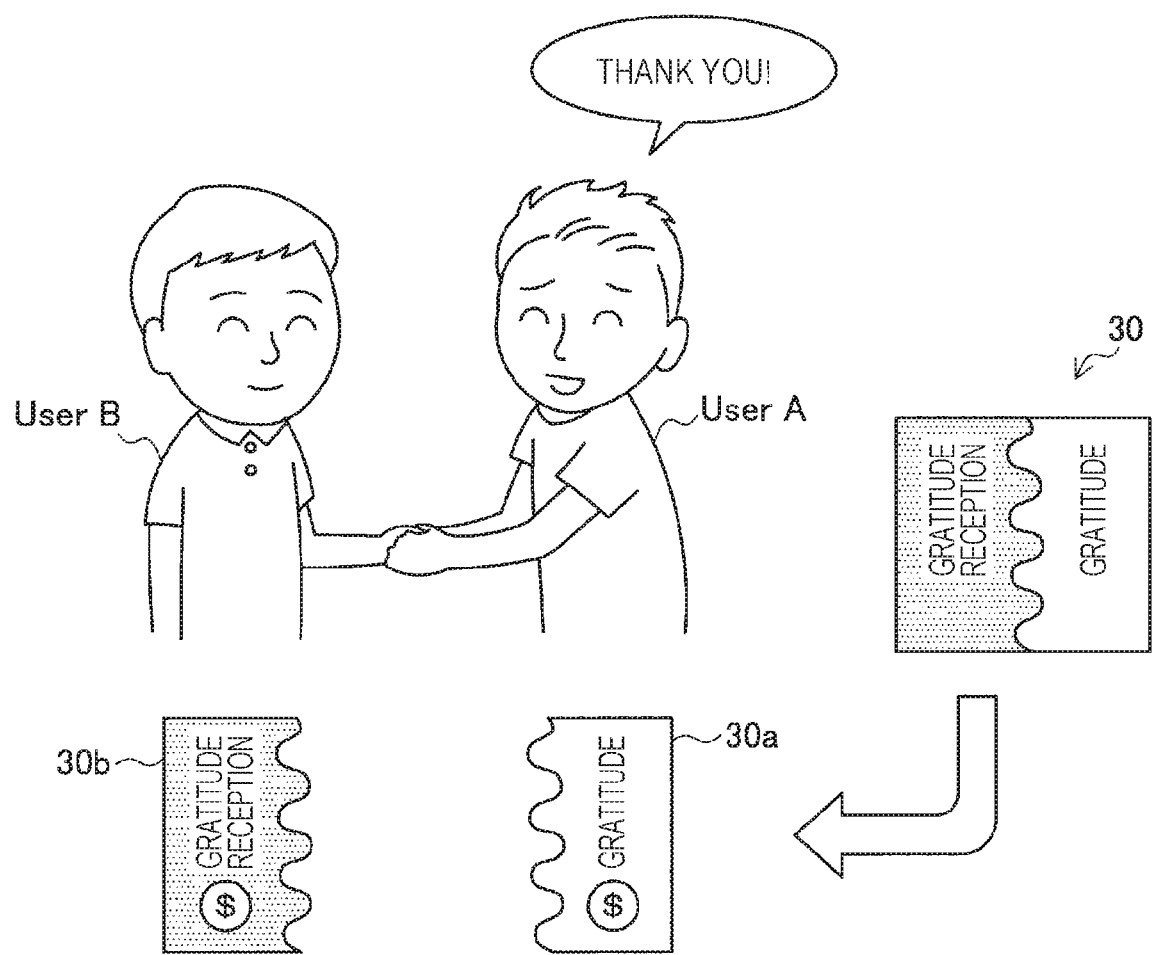
FIG. 1 is an explanatory illustration of the overview of an information processing system according to an embodiment of the present disclosure.

A preferred embodiment of the present disclosure will be described in detail below with reference to the accompanying drawings. Note that, in the present specification and the drawings, the same reference numerals are given to constituent elements having substantially the same functional configurations, respectively and redundant description will be omitted.

Furthermore, the description will be made in the following order.

1. Overview of Information Processing System according to Embodiment of Present Disclosure
2. Configurations
2-1. Configuration of Terminal Device
2-2. Configuration of Server
3. Operation Processing
3-1. First Operation Processing (One Person to One Person)
3-2. Second Operation Processing (One Person to Large Number of Persons)
4. Visualization Processing
5. Applied Example
6. Conclusion «1. Overview of Information Processing System according to Embodiment of Present Disclosure»

FIG. 1 is an explanatory illustration of the overview of an information processing system according to an embodiment of the present disclosure. In the present embodiment, "thank-you currency" 30 that generates value through a gratitude act is issued in advance in a specific group such as a region, a municipality, or a company. The thank-you currency 30 is issued to a regional resident electronically via an electronic wallet application for regional creation, for example.

The thank-you currency 30 does not generate value solely and is conceptually a tally as illustrated in FIG. 1. For example, when a user A expresses gratitude to a user B, thank-you currency 30 retained by the user A is virtually divided (i.e., converted) into gratitude currency 30a (first virtual currency) and gratitude reception currency 30b (second virtual currency) each having value. The gratitude currency 30a is virtual currency that remains on the hand of a person who expresses gratitude (here, user A), and the gratitude reception currency 30b is virtual currency that is delivered to a different person who receives the gratitude (target of gratitude). The gratitude reception currency 30b is transmitted electronically to the different person side via an electronic wallet application, for example. Note that "currency" in the present specification does not mean so-called "money (legal currency)" and is evaluation value obtained by evaluation of the feeling of gratitude.

The gratitude act is assumed to be an act, for example, in which the user utters gratitude words such as "thank you!", "thank you, it was helpful!" and shakes hands with the different person.

The gratitude currency 30a and the gratitude reception currency 30b may be exchangeable for regional currency, a regional discount voucher, or a shopping voucher at a regional exchange site, or may be used as a point at, for example, a regional shop.

As described above, in the present embodiment, the thank-you currency 30 issued regionally is converted into the gratitude currency 30a and the gratitude reception currency 30b each having the value, through the gratitude act to a someone, and distributed to the person who expresses gratitude (person with gratitude) and the different person who receives the gratitude (gratitude reception person), thereby resulting in prompting for expressing the feeling of gratitude.

Figure 2:
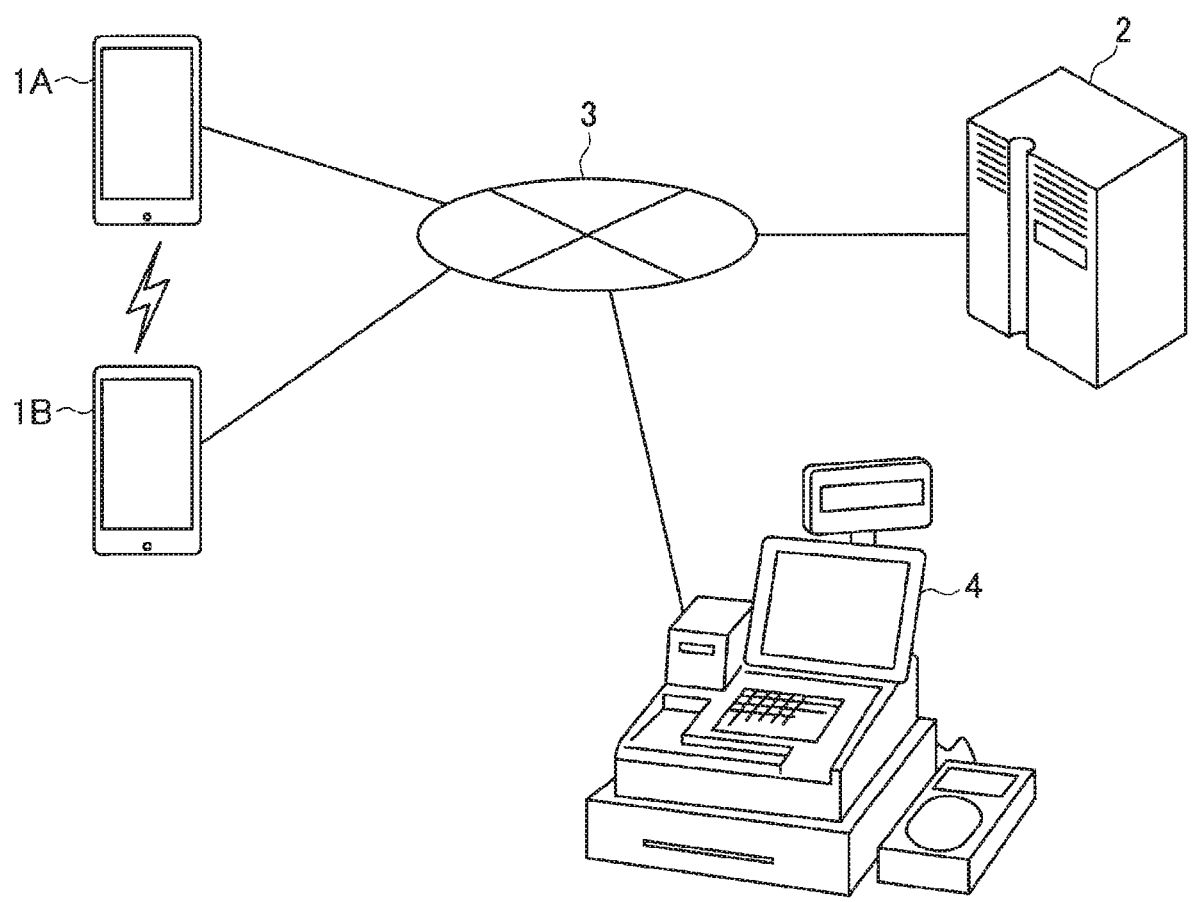
FIG. 2 is an exemplary illustration of the entire configuration of the information processing system according to the present embodiment.

Subsequently, the entire configuration of the information processing system according to the above present embodiment will be described with reference to FIG. 2. FIG. 2 is an exemplary illustration of the entire configuration of the information processing system according to the present embodiment.

As illustrated in FIG. 2, the information processing system according to the present embodiment includes terminal devices 1 (1A, 1B) possessed by each user, a server 2, and a point of sale system (POS) terminal 4 of a store for usage of the gratitude currency 30a and the gratitude reception currency 30b as points.

Each of the terminal devices 1 (client devices) serves as an information processing terminal for example, a smartphone, a mobile phone, or a wearable device such as a smart band, a tablet terminal, a music player, or a game machine. The terminal device 1 detects a gratitude act of the user with various sensors, varies the thank-you currency 30 into the gratitude currency 30a and the gratitude reception currency 30b in accordance with the gratitude act, and then transmits the gratitude reception currency 30b to a different user. For example, electronic wallet applications are installed in the terminal device 1A and the terminal device 1B, respectively. When detecting a gratitude act of the user, the terminal device 1A transmits the gratitude reception currency 30b generated on the basis of the thank-you currency 30 to the terminal device 1B of the different user, through proximity wireless communication (e.g., Wi-Fi (registered trademark), Bluetooth (registered trademark) low energy (BLE), or non-contact communication). Such an electronic wallet application is capable of managing the thank-you currency 30, the gratitude currency 30a, and the gratitude reception currency 30b in number. Furthermore, the terminal device 1 receives an issuance of the thank-you currency 30 from the server 2, and transmits the history of gratitude act by each user to the server 2.

The server 2 is capable of managing the issuance of the thank-you currency 30, and accumulating the history of gratitude act of each user to generate visualized data regarding the status of gratitude act and the usage of points as necessary. The thank-you currency 30 can also be set in issuance number within the budget of a municipality, for example, for revitalizing the municipality.

The information processing system according to the embodiment of the present disclosure has been described above. Subsequently, the respective specific configurations of the devices included in the information processing system according to the present embodiment will be described with reference to the drawings.

«2. Configurations»

<2-1. Configuration of Terminal Device 1>

Figure 3:
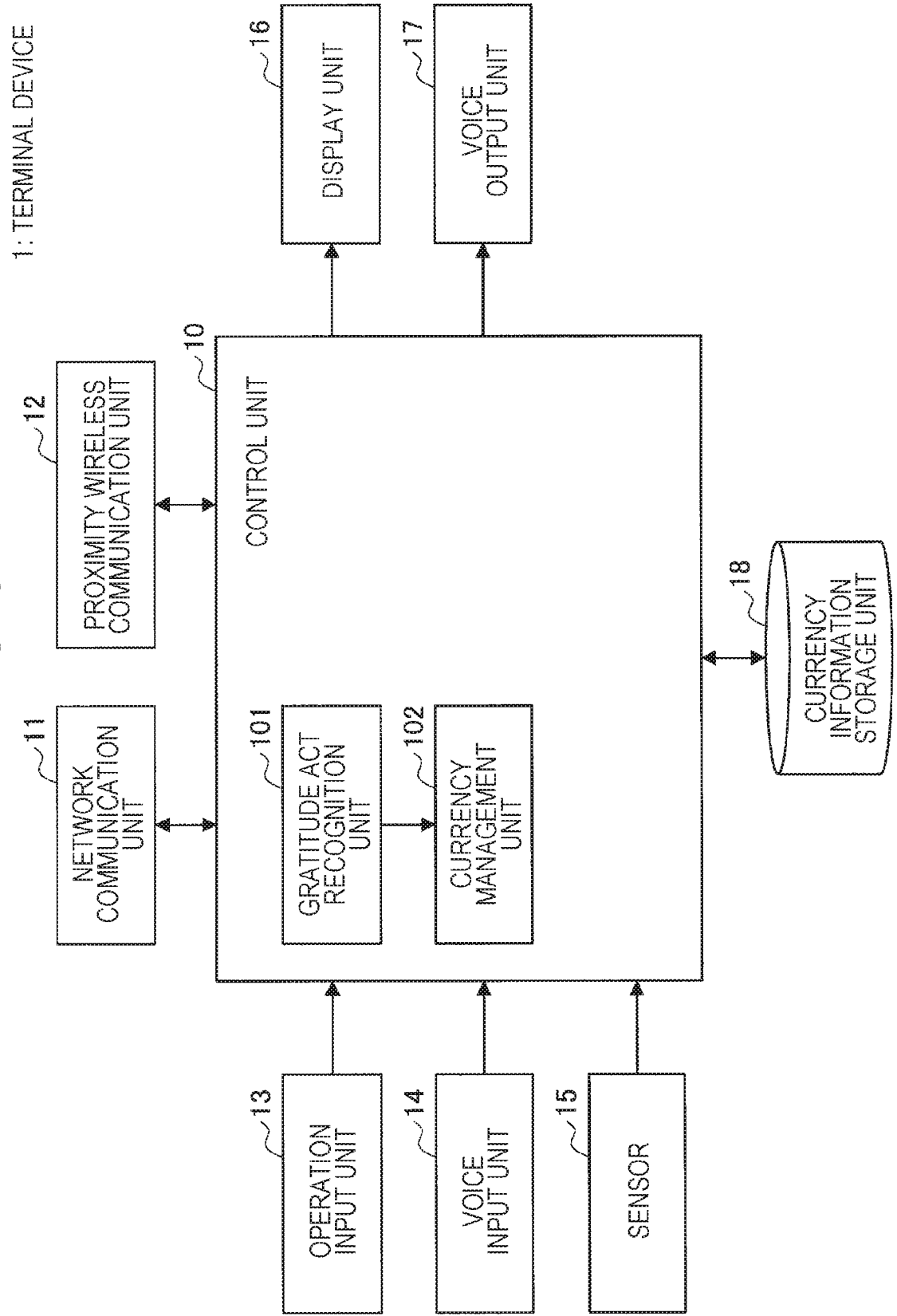
FIG. 3 is a block diagram of an exemplary configuration of a terminal device according to the present embodiment.

FIG. 3 is a block diagram of an exemplary configuration of the terminal device 1 according to the present embodiment. As illustrated in FIG. 3, the terminal device 1 includes a control unit 10, a network communication unit 11, a proximity wireless communication unit 12, an operation input unit 13, a voice input unit 14, a sensor 15, a display unit 16, a voice output unit 17, and a currency information storage unit 18.

The control unit 10 functions as a computation processing device and a control device, and controls the overall operation in the terminal device 1 in accordance with various programs. The control unit 10 is implemented by, for example, an electronic circuit such as a central processing unit (CPU) and a microprocessor. Furthermore, the control unit 10 may include a read only memory (ROM) that stores, for example, a program and a computation parameter to be used, and a random access memory (RAM) that temporarily stores, for example, a parameter that varies suitably.

Furthermore, the control unit 10 according to the present embodiment also functions as a gratitude act recognition unit 101 and a currency management unit 102.

The gratitude act recognition unit 101 recognizes a gratitude act by a user or a gratitude act from the other user. Specifically, the gratitude act recognition unit 101 analyzes voice data collected by the voice input unit 14 to recognize a gratitude utterance such as "thank you", and then recognizes the gratitude utterance as a gratitude act. In the present embodiment, as an example, the thank-you currency 30 is converted into the gratitude currency 30a and the gratitude reception currency 30b for properly expressing of gratitude to the different user, and the thank-you currency 30 is not converted for pretended gratitude. Thus, for example, emphasis is placed on telling the different user clearly "thank you" aloud. Alternative examples of an act instead of telling the different user thank you aloud include:

Put out the user's hand and shake hands with the different user;

Hug to express gratitude to the different user;
Toast with gratitude; and
Applaud with gratitude.

Any of the acts can be sensed by the terminal device 1 or a sensor installed peripherally. The gratitude act recognition unit 101 is capable of recognizing a gratitude act on the basis of, for example, various sensing data (e.g., captured image, acceleration data, and gyro data) sensed by the sensor 15. Furthermore, in a case where a brain machine interface (BMI) is usable, the feeling of gratitude may be detected on the basis of brain information regarding the user.

The currency management unit 102 manages the amounts of thank-you currency 30, gratitude currency 30$a$, and gratitude reception currency 30$b$, and perform conversion processing (generation processing) on thank-you currency 30 held when a gratitude act is recognized, into gratitude currency 30$a$ and gratitude reception currency 30$b$.

Furthermore, in a case where gratitude currency 30$a$ and gratitude reception currency 30$b$ are used as points, the currency management unit 102 allocates a predetermined amount of points (e.g., points set by default) as the gratitude currency 30$a$ and the gratitude reception currency 30$b$.

Furthermore, the currency management unit 102 may change the number of points to be allocated to the gratitude currency 30$a$ and the gratitude reception currency 30$b$, in accordance with the type of gratitude act. For example, for a gratitude act with utterance of "thank you", the currency management unit 102 generates gratitude currency 30$a$ and gratitude reception currency 30$b$ each for 20P, and for a gratitude act with utterance of "thank you very much", the currency management unit 102 generates gratitude currency 30$a$ and gratitude reception 30$b$ each for 40P. Furthermore, for a gratitude act with a repeated utterance of "thank you very much" while holding the hand, the currency management unit 102 may also generate gratitude currency 30$a$ and gratitude reception currency 30$b$ each for 100P. The currency management unit 102 subtracts the generated points from the sum total (e.g., 3000P) in thank-you currency 30 retained by the user.

The voice input unit 14 is implemented by a microphone, a microphone amplifier unit that performs amplification processing on a voice signal obtained by the microphone, and an A/D converter that performs digital conversion on the voice signal. The voice input unit 14 outputs the voice signal to the control unit 10.

The sensor 15 includes various sensor devices that each detect a gratitude act. For example, the sensor 15 may be a camera, an accelerometer, a gyro sensor, or a biosensor.

The display unit 16 serves as a display device that outputs a screen, for example, indicating the current holding status of currency and the history of gratitude act. The display unit 16 may be, for example, a display device such as a liquid crystal display (LCD) or an organic electroluminescence (EL) display.

The voice output unit 17 has a speaker that reproduces a voice signal and an amplifier circuit for the speaker.

The network communication unit 11 is connected to the network 3 wiredly or wirelessly, and transmits data to and receives data from the server 2 on the network. The network communication unit 11 is connected to communicate with the network 3 via, for example, a wired/wireless local area network (LAN), Wi-Fi (registered trademark), a mobile communication network (long term evolution (LTE), or 3G (third generation mobile communication system)).

The proximity wireless communication unit 12 transmits data to and receives data from a peripheral external device through proximity wireless communication. For example, the proximity wireless communication unit 12 performs proximity wireless communication via, for example, Wi-Fi (registered trademark), BLE; Bluetooth (registered trademark) low energy, or non-contact communication. In the present embodiment, gratitude reception currency 30$b$ is transmitted by the proximity wireless communication unit 12 to the terminal device possessed by a gratitude reception user.

The currency information storage unit 18 is implemented by a read only memory (ROM) that stores, for example, a program and a computation parameter to be used for processing by the control unit 10 (specifically, e.g., the amount of thank-you currency 30, gratitude currency 30$a$, and gratitude reception currency 30$b$, and the history of gratitude act), and a random access memory (RAM) that temporarily stores, for example, a parameter that varies suitably. Note that the reliability of the status of the amount of currency and the history of gratitude act (transaction data) managed by each terminal device 1 may be secured with a mechanism such as a blockchain.

The configuration of the terminal device 1 according to the present embodiment has been specifically described above. Note that the configuration of the terminal device 1 is not limited to the example illustrated in FIG. 3. For example, at least part of the configuration of the terminal device 1 may be provided in a different device, and data may be transmitted to and received from the terminal device 1.

<2-2. Configuration of Server 2>

Figure 4:
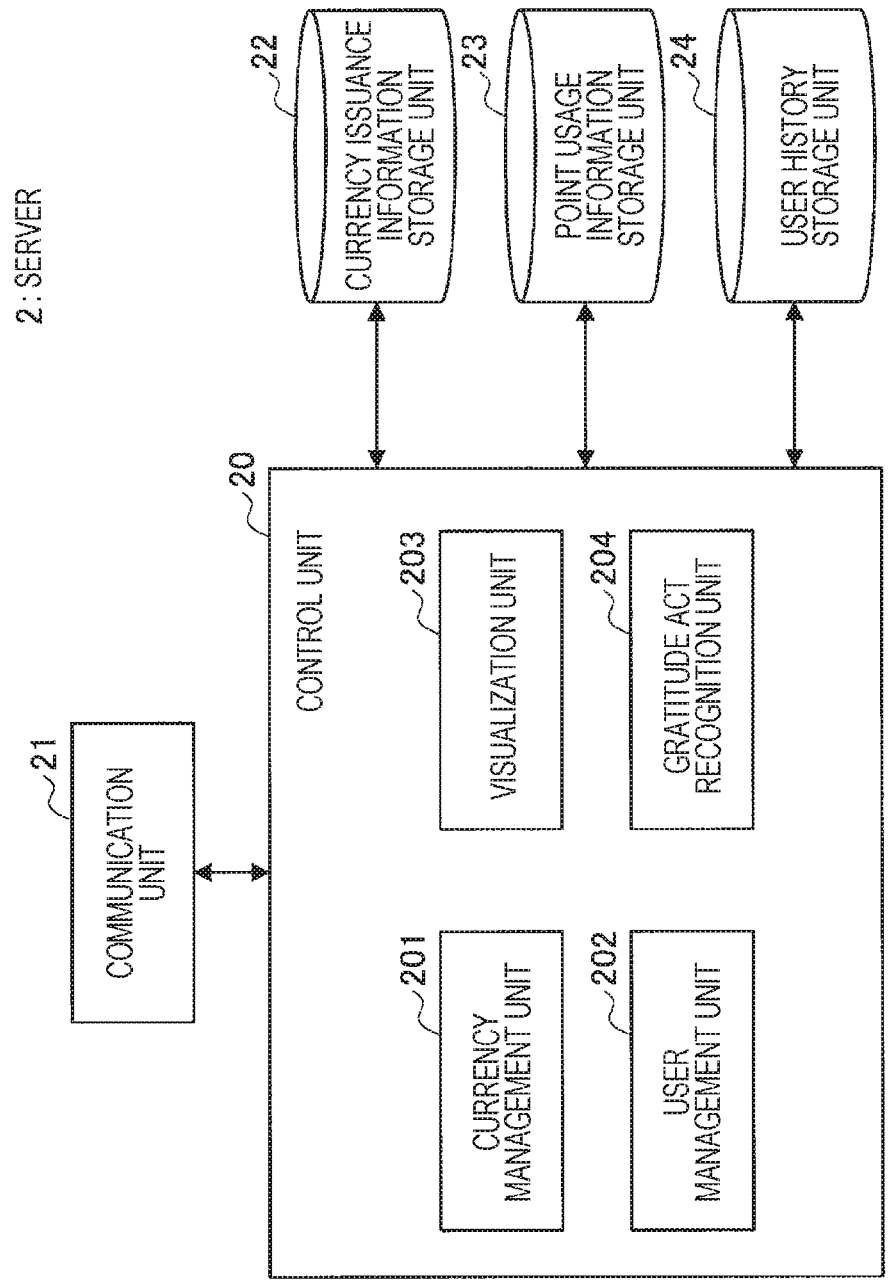
FIG. 4 is a block diagram of an exemplary configuration of a server according to the present embodiment.

FIG. 4 is a block diagram of an exemplary configuration of the server 2 according to the present embodiment. As illustrated in FIG. 4, the server 2 (information processing apparatus) includes a control unit 20, a communication unit 21, a currency issuance information storage unit 22, a point usage information storage unit 23, and a user history storage unit 24.

(Control Unit 20)

The control unit 20 functions as a computation processing device and a control device, and controls the overall operation in the server 2 in accordance with various programs. The control unit 20 is implemented by, for example, an electronic circuit such as a central processing unit (CPU) or a microprocessor. Furthermore, the control unit 20 may include a read only memory (ROM) that stores, for example, a program and a computation parameter to be used, and a random access memory (RAM) that temporarily stores, for example, a parameter that varies suitably.

Furthermore, the control unit 20 according to the present embodiment also functions as a currency management unit 201, a user management unit 202, a visualization unit 203, and a gratitude act recognition unit 204.

The currency management unit 201 manages thank-you currency 30, gratitude currency 30$a$, and gratitude reception currency 30$b$. For example, the currency management unit 201 issues (transmits) a predetermined amount of thank-you currency 30 to a user of a specific group (e.g., a regional inhabitant). Information regarding, for example, the issuance timing, issuance amount, and issuance destination of thank-you currency 30 is stored in the currency issuance information storage unit 22, as currency issuance information. Furthermore, for recognition of a gratitude act on the server 2 side, the currency management unit 201 converts thank-you currency 30 held by a target user into gratitude currency 30$a$ and gratitude reception currency 30$b$ due to a gratitude act, and performs control to impart the gratitude currency 30$a$ to the target user and the gratitude reception currency 30$b$ to a person who receives the gratitude from the target user.

The user management unit 202 manages registration, update, deletion, and the like of user information. Specifically, the user management unit 202 stores the status of the amount of currency (amount of thank-you currency 30, gratitude currency 30a, and gratitude reception currency 30b) held by each user and the history of gratitude act of each user in the user history storage unit 24 and manages the same therein. Furthermore, the user management unit 202 acquires, from the POS terminal 4 of the store, information in point exchange (usage) of the gratitude currency 30a or the gratitude reception currency 30b by each user in the store, and stores the acquired information into the point usage information storage unit 23. The point usage information includes a POS terminal number (ID), a usage user ID, the number of usage of points (furthermore, usage of either the gratitude currency 30a or the gratitude reception currency 30b), and a date and time.

The visualization unit 203 has a function of visualizing the status of point usage and the status of gratitude act, such as an image obtained by mapping the status of point usage on a map, and an image schematically depicting the status of gratitude act among users in a specific group.

The gratitude act recognition unit 204, similarly to the gratitude act recognition unit 101 of the terminal device 1 described above, recognizes a gratitude act of the user or a gratitude act from the other user on the basis of at least either of voice data or sensor data. In the present embodiment, a gratitude act may be recognized by the terminal device 1, or may be recognized by the gratitude act recognition unit 204 of the server 2 on the basis of voice data or sensor data transmitted from the terminal device 1.

The communication unit 21 is connected to the network 3 by wiredly or wirelessly, and transmits data to and receives data from each terminal device 1 via the network 3. The network communication unit 21 is connected to communicate with the network 3 via, for example, a wired/wireless local area network (LAN), or Wireless Fidelity (Wi-Fi, registered trademark).

The currency issuance information storage unit 22, the point usage information storage unit 23, and the user history storage unit 24 are each included in a storage device including, for example, a storage medium, a recording device that records data in the storage medium, a reading device that reads data from the storage medium, and a deletion device that deletes data recorded in the storage medium.

The configuration of the server 2 according to the present embodiment has been specifically described above. Note that the configuration of the server 2 is not limited to the example illustrated in FIG. 4. For example, at least part of the configuration of the server 2 may be provided in a different device, and data may be transmitted to and received from the server 2.

«3. Operation Processing»

Subsequently, operation processing of the information processing system according to the present embodiment will be specifically described with the drawings.

<3-1. First Operation Processing (One Person to One Person)>

First, first operation processing according to the present embodiment will be described with reference to FIGS. 5 to 7. Here, for example, there will be described operation processing of the terminal device 1A possessed by the user A and the terminal device 1B possessed by the user B, in a case where the user A is in trouble, the user B does the user A a kind turn (e.g., ride in a car, carrying luggage, and help during getting lost) and the user A expresses gratitude with telling the user B "thank you" aloud. At this time, when recognizing the gratitude act of the user A, the terminal device 1A generates gratitude currency 30a and gratitude reception currency 30b to transmit the gratitude reception currency 30b to the terminal device 1B. Note that operation processing described below may be performed by the electronic wallet application installed in the terminal device 1.

Figure 5:
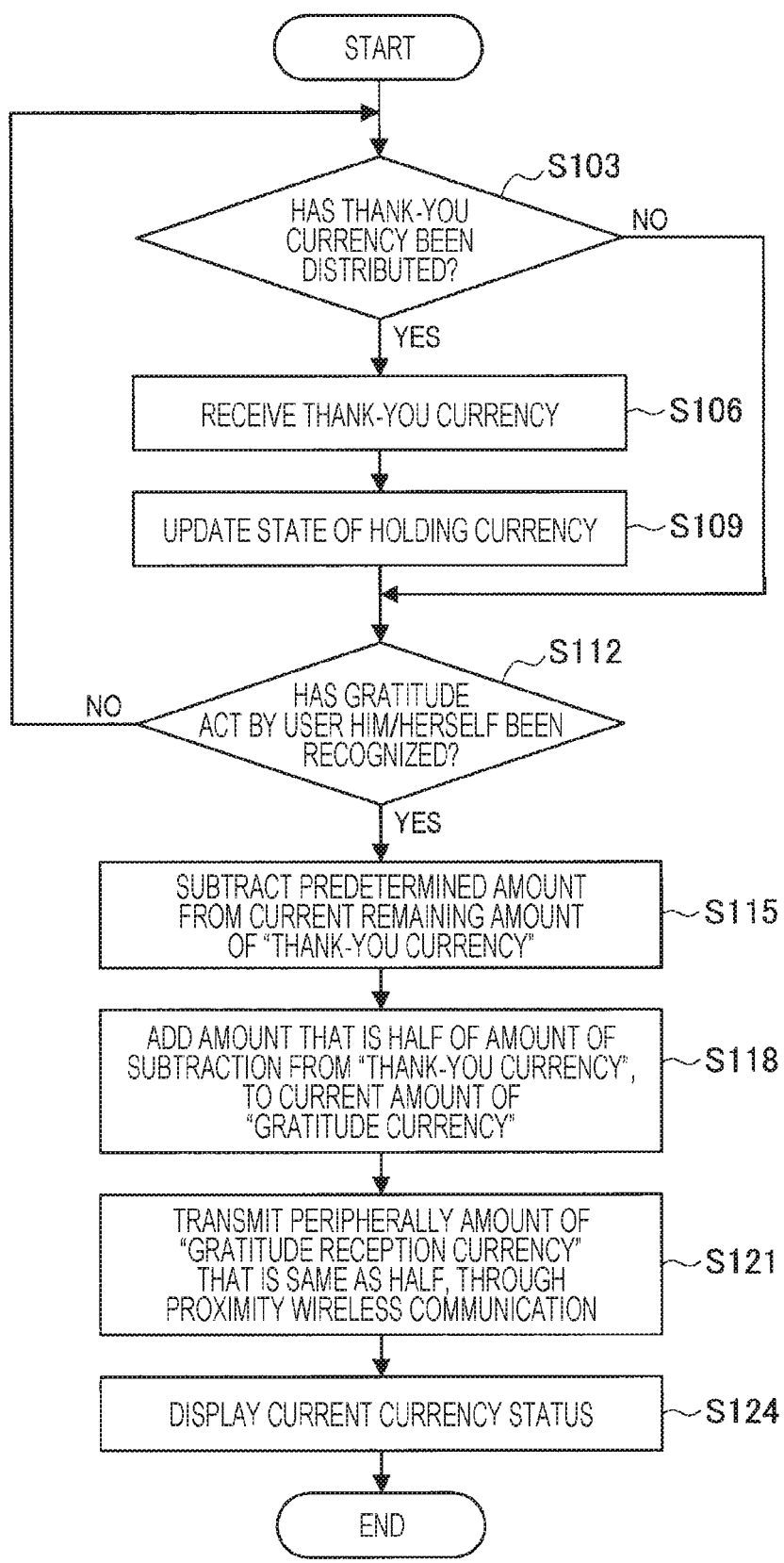
FIG. 5 is a flowchart of operation processing in a terminal device on the gratitude act side according to the present embodiment.
Figure 6:
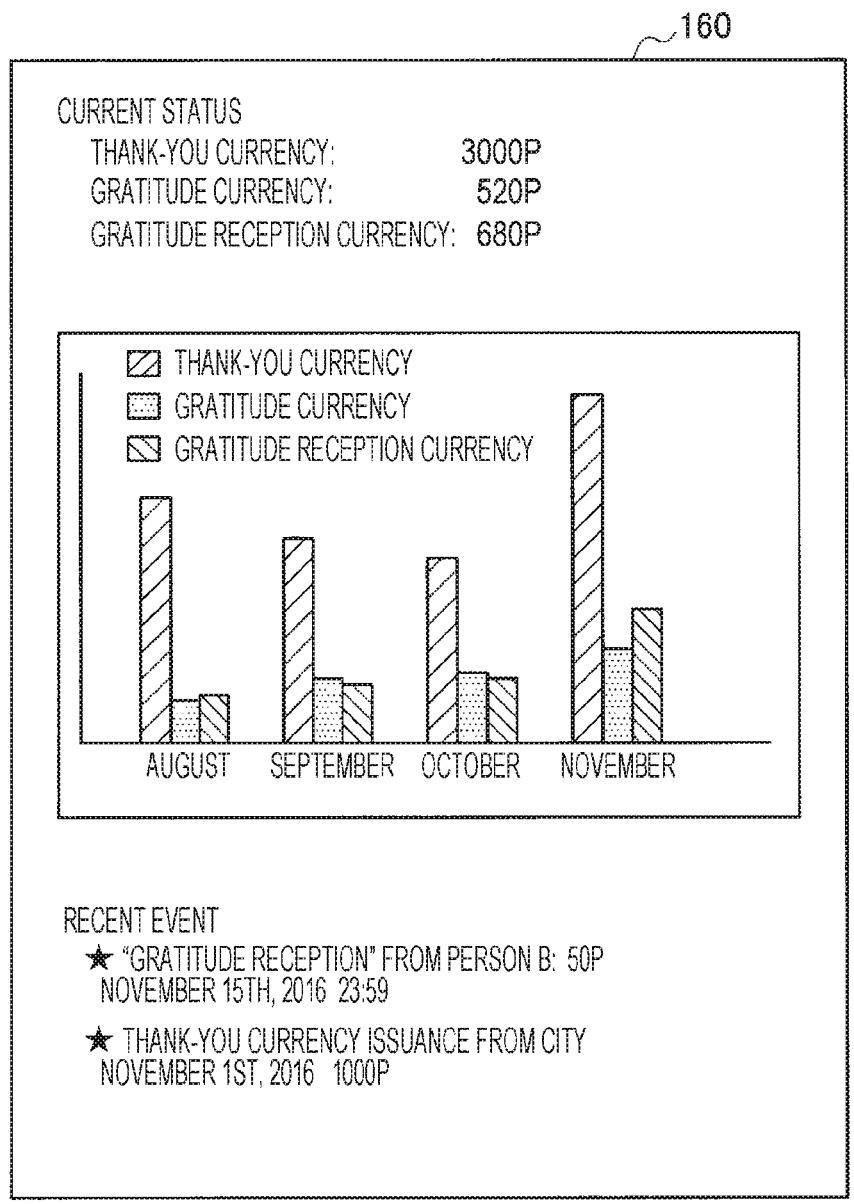
FIG. 6 is an illustration of an exemplary notice screen of a currency status according to the present embodiment.

FIG. 5 is a flowchart of operation processing in the terminal device 1A on the gratitude act side according to the present embodiment. As illustrated in FIG. 5, first, in a case where thank-you currency has been distributed in a specific group (step S103/Yes), the terminal device 1A receives the thank-you currency from the server 2 (step S106). The "thank-you currency" can be issued to a regional resident, for example, in a municipality for regional revitalization. For example, in a case where (virtual) currency according to the present embodiment is used as a point, a predetermined amount of points (e.g., 1000P) is issued as the "thank-you currency".

Next, the currency management unit 102 of the terminal device 1A updates the status of holding currency, on the basis of the received amount of thank-you currency (step S109). The currency information storage unit 18 retains the respective holding amounts of thank-you currency, gratitude currency, and gratitude reception currency, and the currency management unit 102 adds the amount of thank-you currency received this time to the current amount of thank-you currency.

Next, the gratitude act recognition unit 101 recognizes a gratitude act by the user him/herself, on the basis of a voice input by the voice input unit 14 and sensor data sensed by the sensor 15 (step S112). For example, in verification of an utterance of "thank you" with voice analysis of collected voice data, the gratitude act recognition unit 101 further verifies whether or not the utterance is the user A's utterance, who is the owner of the terminal device 1A, with voiceprint analysis.

Next, in a case where a gratitude act by the user him/herself has been recognized (step S112/Yes), the currency management unit 102 subtracts a predetermined amount (e.g., 100P) from the current remaining amount of "thank-you currency" (step S115).

Next, the currency management unit 102 adds the amount of points (e.g., 50P) that is half of the amount of subtraction from the "thank-you currency", to the current amount of "gratitude currency" (step S118).

Next, the currency management unit 102 transmits peripherally "gratitude reception currency" of the amount of points (e.g., 50P) that is the same as the half, through the proximity wireless communication (step S121). There is assumed an utterance of gratitude words to a person ahead. Thus, it is assumed that the terminal device 1B possessed by the user B who receives the gratitude is also present nearby, whereby peripherally transmitting of the predetermined amount of "gratitude reception currency" makes it possible to transmit the same to the terminal device 1B. Note that, for transmission of "gratitude reception currency", a packet actually corresponding to the gratitude reception currency may be transmitted, or only data indicating the amount of gratitude reception currency and the amount in number may be transmitted.

As described above, in the present embodiment, the "thank-you currency" is converted into the "gratitude currency" and the "gratitude reception currency" that are usable as points to generate value.

Note that, in the present embodiment, as an example, the amount of points that is half of a predetermined amount of subtraction from the "thank-you currency" is imparted to each of the "gratitude currency" and the "gratitude reception currency". The point allocation (amount of "gratitude currency" and "gratitude reception currency"), however, is not limited to the example.

Then, the currency management unit 102 can display the current currency status on the display unit 16 to notify the user of the current currency status (step S124). Here, FIG. 6 illustrates an exemplary notice screen of the currency status according to the present embodiment. As illustrated in FIG. 6, a notice screen 160 indicates the current amount of thank-you currency, the current amount of gratitude currency, and the current amount of gratitude reception currency as the current status, and indicates, with a graph, the amounts of thank-you currency, gratitude currency, and gratitude reception currency for each of the most recent months as the history of the most recent currency status. Moreover, as a "recent event", there are indicated reception of an issuance of thank-you currency, reception of gratitude reception currency from a different person, and although unillustrated, generation of gratitude currency as a result of gratitude to a different person, for example. An unclear identification of a person who expresses gratitude or who receives the gratitude may not be explicated particularly.

Subsequently, operation processing in the terminal device 1B possessed by the user B who has received the gratitude act from the user A will be described with reference to FIG. 7. FIG. 7 is a flowchart of operation processing in the terminal device 1B on the gratitude reception side according to the present embodiment.

Figure 7:
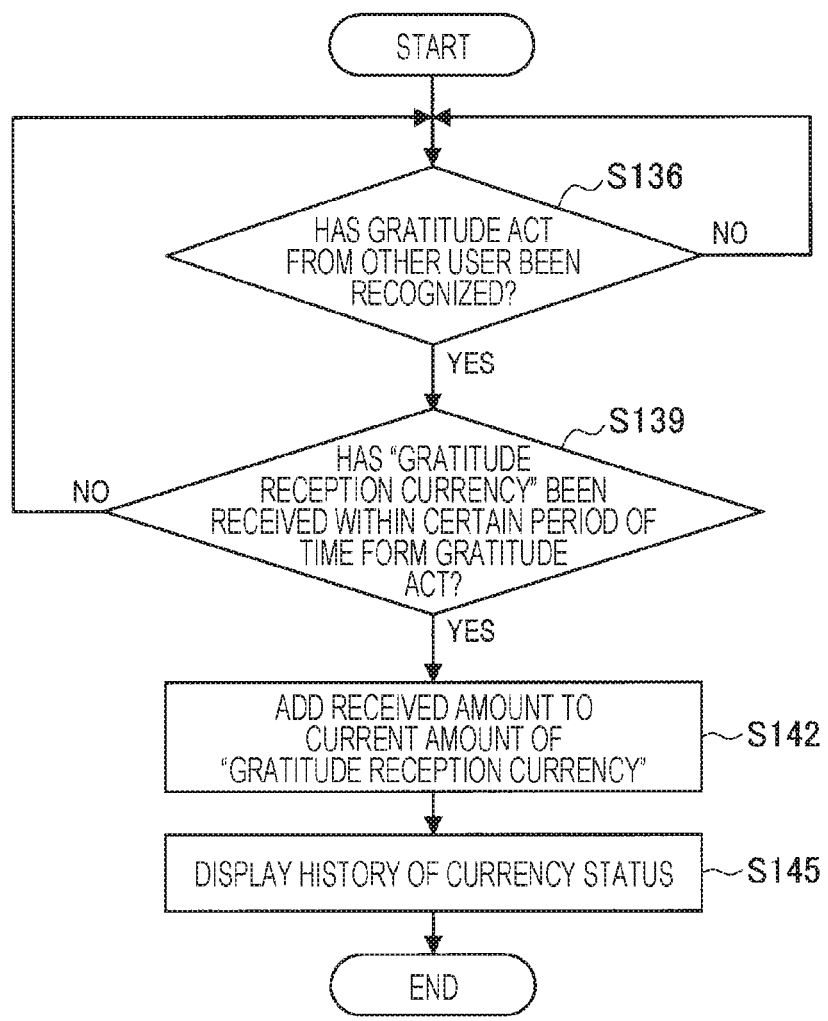
FIG. 7 is a flowchart of operation processing in a terminal device on the gratitude reception side according to the present embodiment.

As illustrated in FIG. 7, first, the gratitude act recognition unit 101 of the terminal device 1B determines whether or not a gratitude act from a different user has been recognized, on the basis of collected voice data (step S136). For example, for an utterance of "thank you" by the user A, the voice of the user A is collected by the voice input unit 14 of the terminal device 1B possessed by the user B, and "thank you" with a predetermined voice level or larger is detected. Moreover, the gratitude act recognition unit 101 recognizes, with voiceprint analysis, that the utterance of "thank you" is not a gratitude act from the user B who is the owner of the terminal device 1B and the utterance is a gratitude act from a different user.

Next, it is determined whether or not a "gratitude reception notice" has been received within a certain period of time from the gratitude act (step S139). As described above, a predetermined amount of gratitude reception currency is transmitted through the proximity wireless communication from the terminal device 1A of the user A who has performed the gratitude act. Thus, it is assumed that the terminal device 1B of the user B who has received the gratitude words receives the gratitude reception currency.

Next, in a case where a "gratitude reception notice" has been received within a certain period of time (step S139/Yes), the currency management unit 102 of the terminal device 1B adds the received amount to the current amount of "gratitude reception currency" managed by the currency information storage unit 18 (step S142).

Then, the control unit 10 of the terminal device 1B displays, for example, the history of currency status or the current amount of currency on the display unit 16, thereby allowing notification to the user B of the acquisition of the "gratitude reception currency" and the current holding amount of "gratitude reception currency" (step S145).

The first operation processing has been specifically described above. For the first operation processing, there has been described the generation of the gratitude currency and the gratitude reception currency due to the gratitude act from the user A to the user B in the one person-to-one person relationship.

<3-2. Second Operation Processing (One Person to a large number of Persons)>

Figure 8:
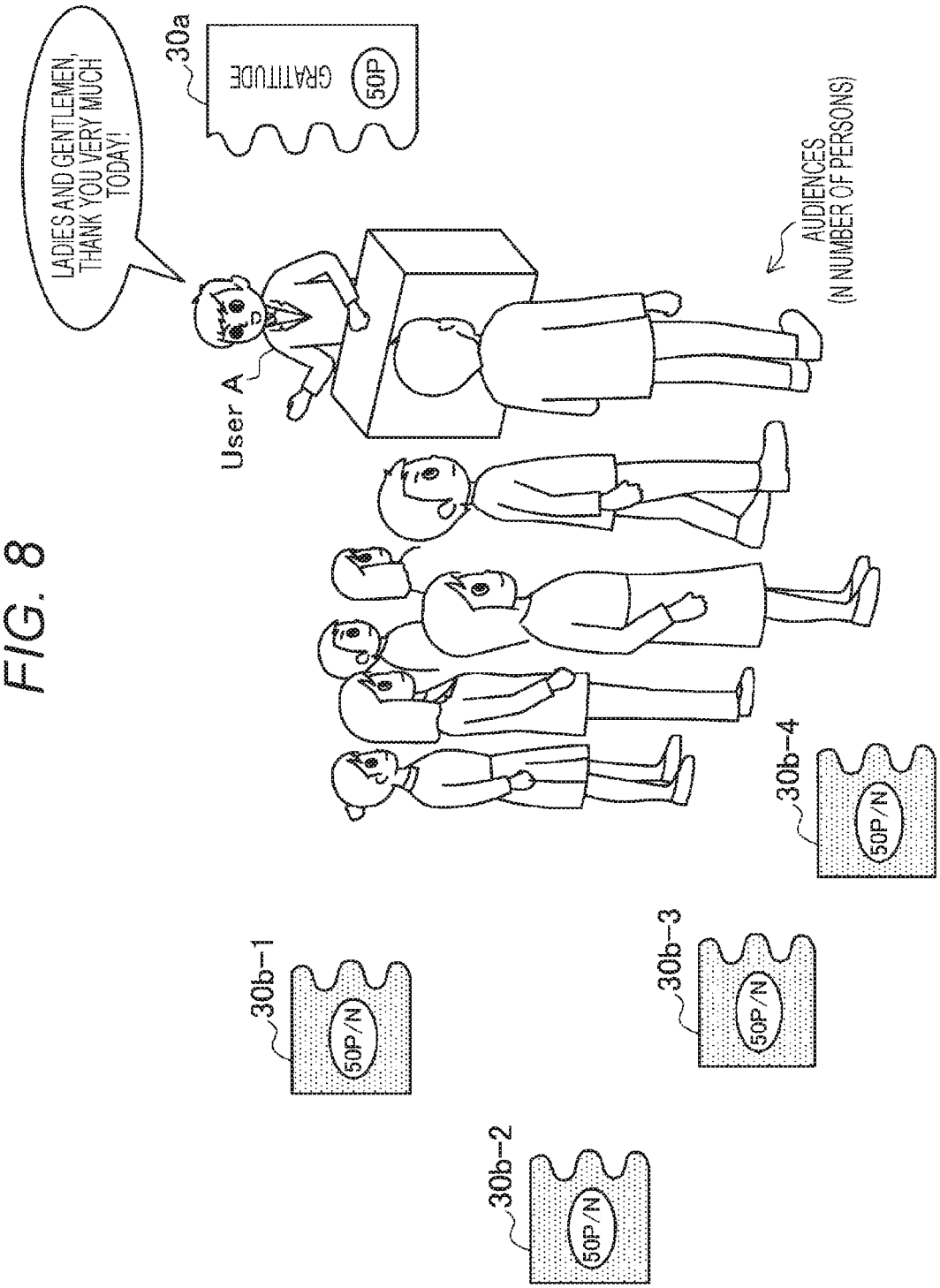
FIG. 8 is an explanatory illustration of the overview of gratitude act in one person to a large number of persons and generation of gratitude currency and gratitude reception currency according to the present embodiment.

Subsequently, second operation processing according to the present embodiment will be described with reference to FIGS. 8 to 9. For the second operation processing, there is assumed a case of expressing of gratitude to a large number of different persons. FIG. 8 is an explanatory illustration of the overview of gratitude act in one person to a large number of persons and generation of gratitude currency and gratitude reception currency. As illustrated in FIG. 8, for example, even in a case where a user A (speaker) expresses gratitude with telling a large number of audiences "thank you" aloud at a podium at a lecture, gratitude currency 30*a* and gratitude reception currency 30*b* each generating value are generated, on the basis of thank-you currency of the user A. At this time, the gratitude reception currency 30*b* (30*b*-1 to 30*b*-4 . . . ) is defined as the number of points divided by the number of audiences. For example, in a case where 100P are subtracted from the thank-you currency and the gratitude currency is defined as "50P", the gratitude reception currency is defined as "50P/N" (N number of audiences).

Hereinafter, the generation of the gratitude currency and the gratitude reception currency for the gratitude act in the one person to the large number of persons as described above will be specifically described with reference to FIG. 9.

Figure 9:
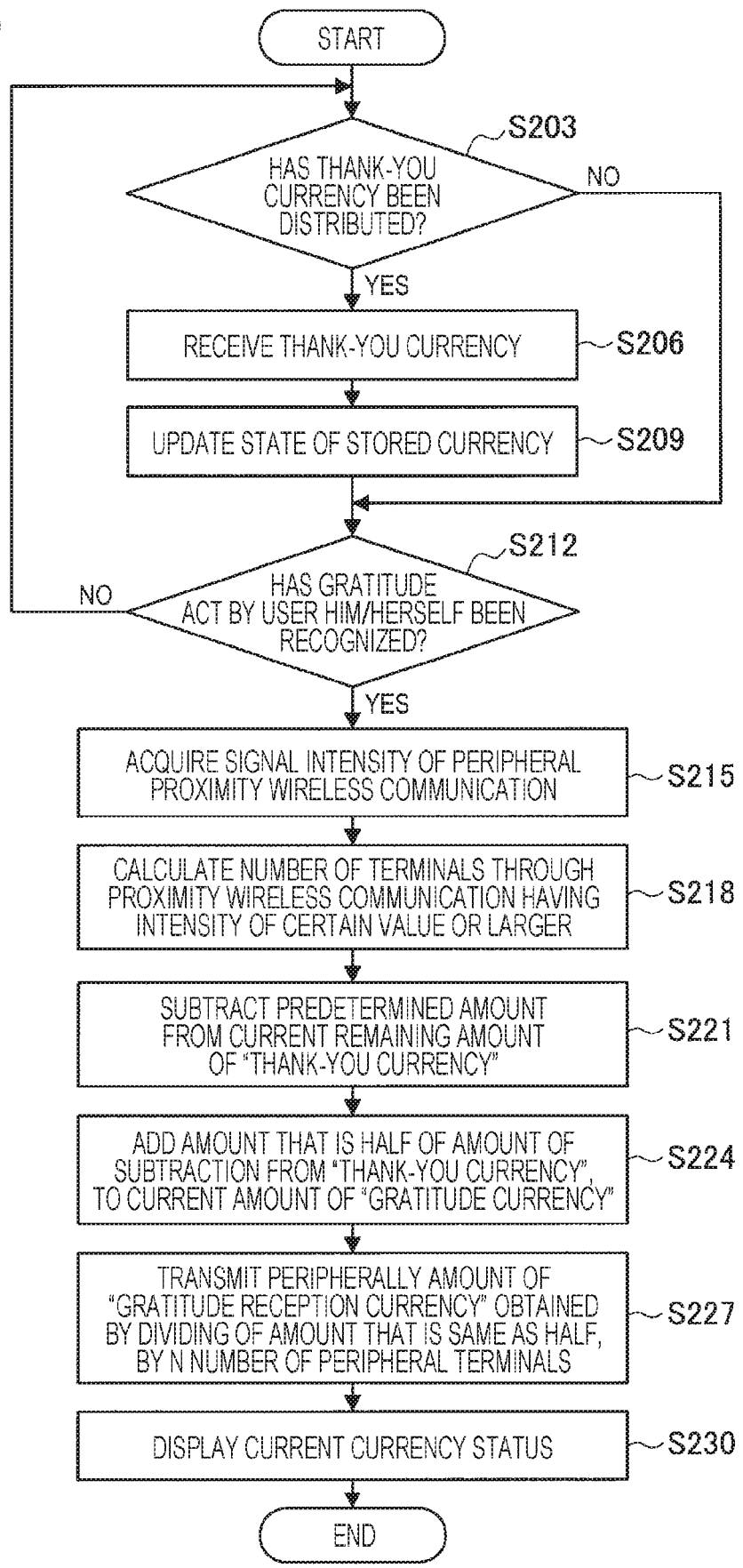
FIG. 9 is a flowchart of operation processing of a terminal device 1A on the gratitude act side in the one person to the large number of persons according to the present embodiment.

FIG. 9 is a flowchart of operation processing of the terminal device 1A on the gratitude act side in the one person to the large number of persons according to the present embodiment. As illustrated in FIG. 9, first, in a case where thank-you currency has been distributed into a specific group (step S203/Yes), the terminal device 1A receives the thank-you currency from the server 2 (step S206). Similarly to the operation processing described above, the "thank-you currency" can be issued to a regional resident, for example, in a municipality for regional revitalization.

Next, the currency management unit 102 of the terminal device 1A updates the state of holding currency, on the basis of the received amount of thank-you currency (step S209).

Next, the gratitude act recognition unit 101 recognizes a gratitude act by the user him/herself, on the basis of a voice input by the voice input unit 14 and sensor data sensed by the sensor 15 (step S212).

Next, in a case where a gratitude act by the user him/herself has been recognized (step S212/Yes), the currency management unit 102 acquires the signal intensity (radio wave intensity) of proximity wireless communication emitted from a peripheral communication terminal (step S215).

Next, the currency management unit 102 calculates N number of terminals through the proximity wireless communication having an intensity of a certain value or larger (step S218). This calculation makes it possible to grasp the number of persons who receive the gratitude from the user. Note that, as an example, there has been described here the calculation of the number of terminals with the radio wave intensity; however, the present embodiment is not limited to the example.

Next, the currency management unit 102 subtracts a predetermined amount (e.g., 100P) from the current remaining amount of "thank-you currency" (step S221).

Next, the currency management unit 102 adds the amount of points (e.g., 50P) that is half of the amount of subtraction from the "thank-you currency", to the current amount of "gratitude currency" (step S224).

Next, the currency management unit 102 transmits peripherally the amount of "gratitude reception currency" obtained by dividing of the amount of points (e.g., 50P) that is the same as the half, by N number of peripheral terminals, through the proximity wireless communication, (step S227).

Then, the currency management unit 102 can display the current currency status on the display unit 16 to notify the user of the current currency status (step S230).

Receiving processing on the "gratitude reception currency" on the audience side is similar to the processing described with reference to FIG. 7, and the details are omitted here. Each of the audiences can receive the "gratitude reception currency" at the terminal device 1 possessed by the audience and record the same in the terminal device 1.

The generation of the gratitude currency and the gratitude reception currency in the one person to the large number of persons has been specifically described above.

Note that the transmission and reception of the "gratitude reception currency" through the proximity wireless communication may be directional instead of nondirectional. This is because it is assumed that both parties face to each other in a gratitude act.

«4. Visualization Processing»

The history of gratitude act and the history of currency status described above each are correlated to a user ID and periodically uploaded to the server 2. Thus, the server 2 according to the present embodiment makes it possible to visualize the flow of "gratitude currency" and "gratitude reception currency" between each user, on the basis of, for example, the history of gratitude act of each user accumulated in the user history storage unit 24.

Publishing of the visualized results allows intuitive grasp of the flow and amount of gratitude act of each constituent member and motivates the constituent member to increase a gratitude act more, so that further vitalization is expected. Furthermore, those who supply thank-you currency can also grasp the entire picture in a specific group, which makes it possible to draft a specific measure for vitalization.

Furthermore, publishing or checking of visualized images maintains the fairness in utilization of the thank-you currency. For example, a case where mutual gratitude acts are frequent only between specific users leads to suspicion of intentional gratitude with purposes by both parties and earning of gratitude currency and gratitude reception currency. Thus, such acts can be inhibited.

(Operation Processing)

Figure 10:
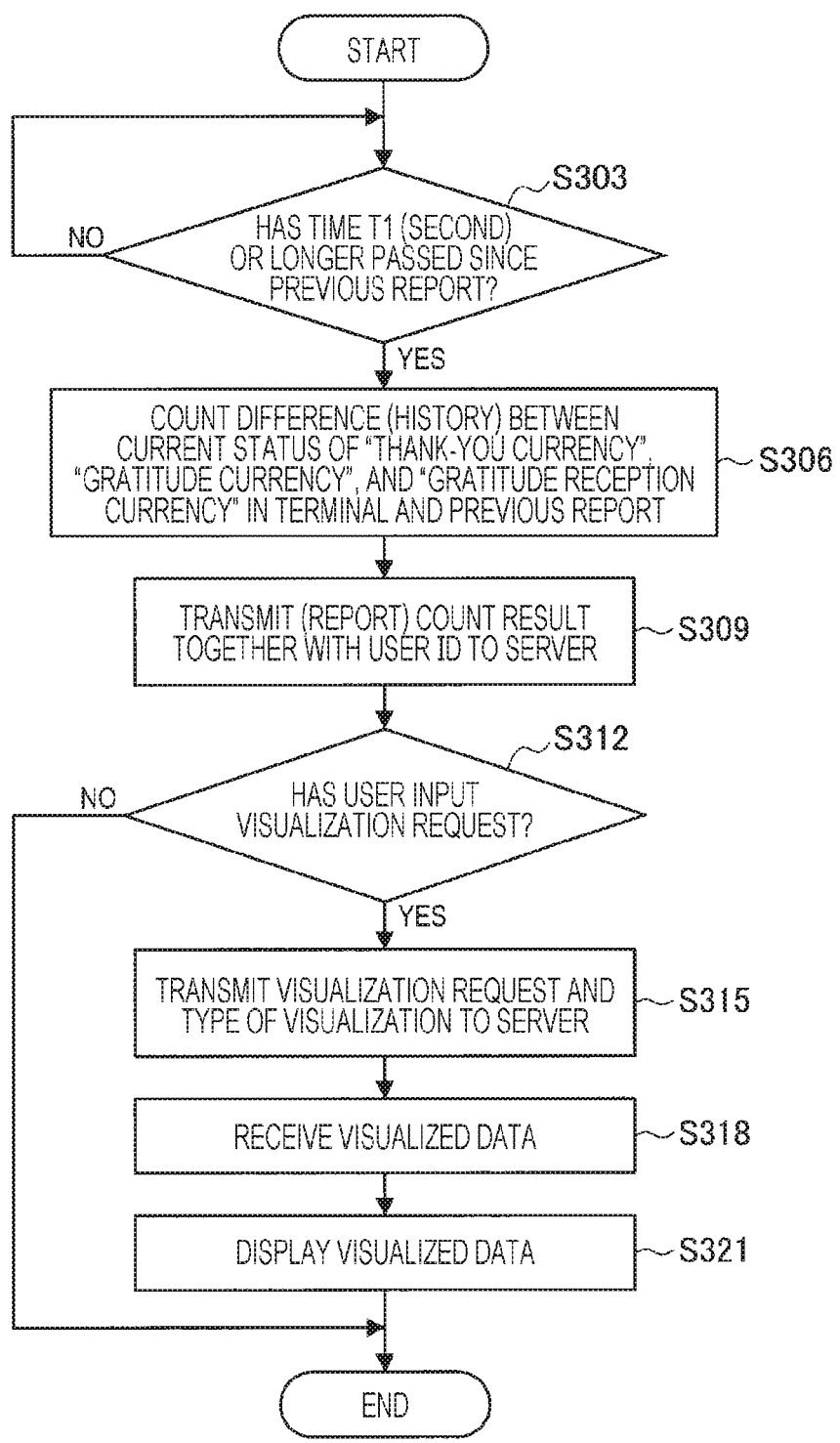
FIG. 10 is a flowchart of operation processing in the terminal device according to the present embodiment.

First, operation processing in the terminal device 1 will be described with reference to FIG. 10. As illustrated in FIG. 10, in a case where time T1 (second) or longer has passed since the previous report (step S303/Yes), the terminal device 1 counts the difference between the current status of "thank-you currency", "gratitude currency", and "gratitude reception currency" in the terminal and the previous report (history) (step S306).

Next, the terminal device 1 transmits the count result together with a user ID to the server 2 (step S309).

Next, in a case where the user has input a visualization request (step S312/Yes), the visualization request and the type of visualization are transmitted to the server 2 (step S315). The type of visualization includes the type of graph in visualization, as well as identifying of the scope of visualization such as the scope of gratitude acts and timing to be visualized. For example, there can be requested visualization by designating of a specific date and time (e.g., weekly basis, monthly basis, or annual basis) for a specific group (municipality) to which the user him/herself belongs.

Next, in a case where the visualized data from the server 2 has been received (step S318), the control unit 10 of the terminal device 1 displays a visualized image generated by the server 2 on the display unit 16 (step S321). Specific examples of the visualized image will be described later with reference to FIGS. 12 and 13.

Figure 11:
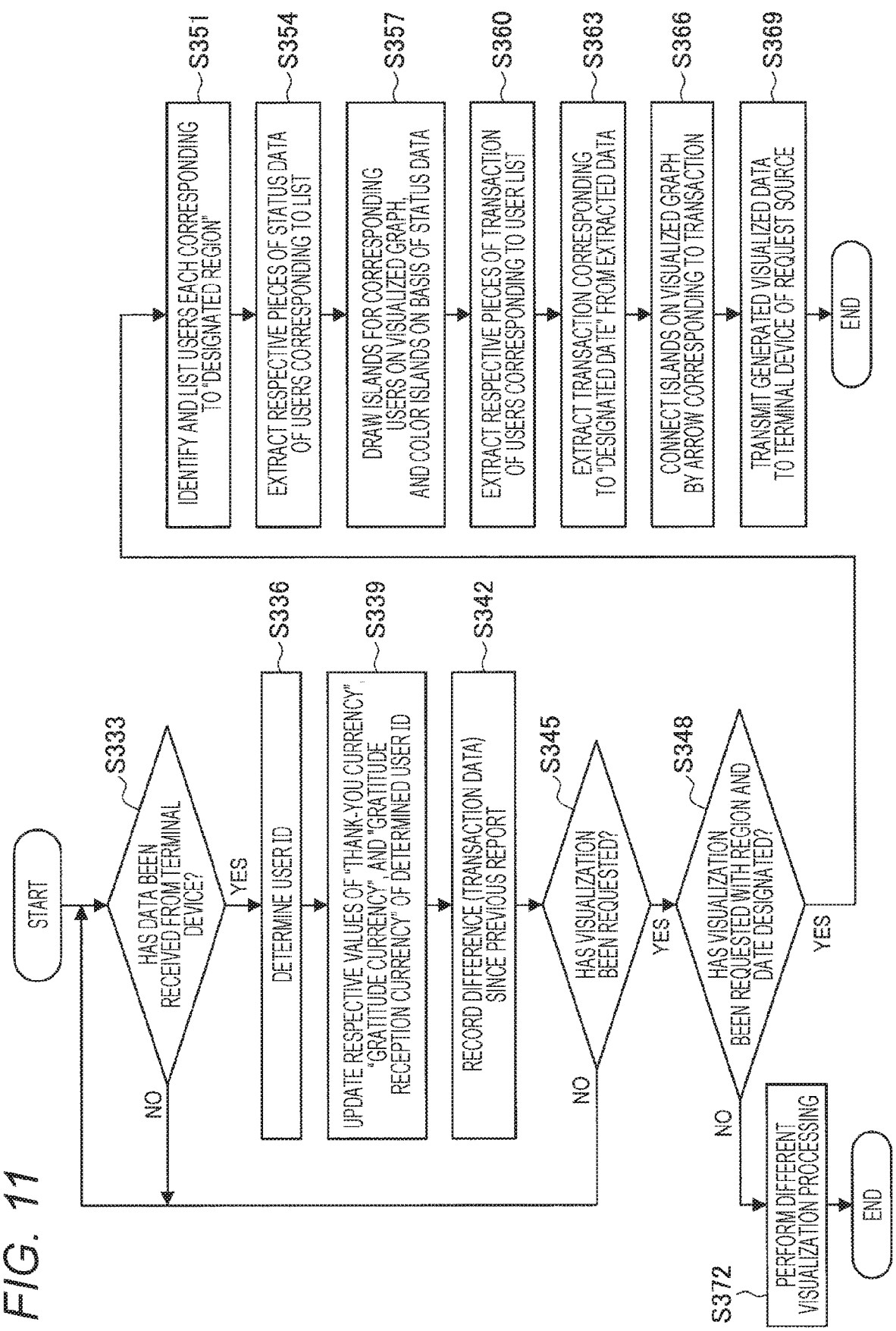
FIG. 11 is a flowchart of operation processing in the server according to the present embodiment.

Subsequently, operation processing in the server 2 will be described with reference to FIG. 11. As illustrated in FIG. 11, first, in a case where data (count result) has been received from the terminal device 1 (step S333/Yes), the user management unit 202 of the server 2 determines a user ID, on the basis of the received data (step S336).

Next, the user management unit 202 updates, on the basis of the received data (count result), the respective values of "thank-you currency", "gratitude currency", and "gratitude reception currency" to be correlated to the determined user ID, in the user history storage unit 24 (step S339).

Next, the user management unit 202 stores, in the user history storage unit 24, the difference of transaction data (gratitude act) since the previous report from the terminal device 1 (step S342).

Here, in the user history storage unit 24, status data (history of the amount of currency) and transaction data (history of gratitude act) are accumulated in correlation to a user ID.

For example, as indicated in Table 1 below, the status data is data in which thank-you currency, gratitude currency, gratitude reception currency, and the amount obtained by adding of the gratitude currency and the gratitude reception currency are correlated to each user ID.

TABLE 1

| User ID | Thank-you currency | Gratitude currency | Gratitude reception currency | Gratitude currency + Gratitude reception currency |
|---------|--------------------|--------------------|------------------------------|---------------------------------------------------|
| ...     | ...                | ...                | ...                          | ...                                               |
| 00001112 | 2140P             | 520P               | 680P                         | 1200P                                             |
| 00001113 | 2000P             | 520P               | 120P                         | 640P                                              |
| 00001114 | 2440P             | 520P               | 480P                         | 1000P                                             |
| 00001115 | 1880P             | 720P               | 680P                         | 1400P                                             |
| ...     | ...                | ...                | ...                          | ...                                               |

Furthermore, as indicated in Table 2 below, the transaction data is data in which, as a gratitude act of each of the users, points of variation in "gratitude currency" and "gratitude reception currency" are recorded together with the time stamps and a different person (if identifiable).

TABLE 2

| User ID | Time stamp | Transaction | To/From whom |
|---------|------------|-------------|--------------|
| ...     | ...        | ...         | ...          |
| 00001112 | 2016 Nov. 15 23:59:01 | Gratitude: 20 | 00001113 (Person B) |
| 00001112 | 2016 Nov. 15 15:23:00 | Gratitude reception: 20 | 00001113 (Person B) |
| 00001112 | 2016 Nov. 15 10:13:00 | Gratitude: 80 | 00001114 (Person C) |
| 00001112 | 2016 Nov. 15 23:59:01 | Gratitude reception: 40 | 00001114 (Person C) |
| 00001112 | 2016 Nov. 15 9:50:01 | Gratitude: 100 | 00001115 (Person D) |
| 00001112 | 2016 Nov. 15 20:29:31 | Gratitude reception: 60 | 00001115 (Person D) |
| ...     | ...        | ...         | ...          |
| 00001114 | 2016 Nov. 15 17:59:01 | Gratitude: 20 | 00001115 (Person D) |

TABLE 2-continued

| User ID | Time stamp | Transaction | To/From whom |
|---------|-----------|-------------|--------------|
| 00001114 | 2016 Nov. 15 23:59:01 | Gratitude reception: 20 | 00001115 (Person D) |
| ... | ... | ... | ... |

Next, in a case where visualization has been requested from the terminal device 1 (step S345/Yes), the visualization unit 203 determines whether or not the visualization has been requested with a region and a date designated (step S348). The designation of the date is not limited to a specific one day, and for example, two days or longer, a weekly basis, or a monthly basis may be designated.

Next, in a case where visualization has been requested with a region and a date designated (step S348/Yes), the visualization unit 203 identifies and lists users each corresponding to the designated region (step S351).

Next, the visualization unit 203 extracts the respective pieces of status data of the users corresponding to the list, from the user history storage unit 24 (step S354).

Next, the visualization unit 203 draws islands for the corresponding users, respectively, on a visualized graph, and then colors the islands, on the basis of the status data (step S357). Specifically, for example, coloring is made in accordance with the additional value of gratitude currency and gratitude reception currency included in the status data.

Next, the visualization unit 203 extracts the respective pieces of transaction data of the users corresponding to the list, from the user history storage unit 24 (step S360).

Next, the visualization unit 203 extracts the respective pieces of transaction data with the designated date from the extracted data (step S363), and connects the islands corresponding to the users on the visualized graph, respectively by an arrow in a form corresponding to the transaction data (step S366). Specifically, for example, the visualization unit 203 adds an arrow representing the degree of gratitude act of each user included in the transaction data.

Then, the visualization unit 203 transmits the created visualized graph to the terminal device 1 of the request source (step S369).

Figure 12:
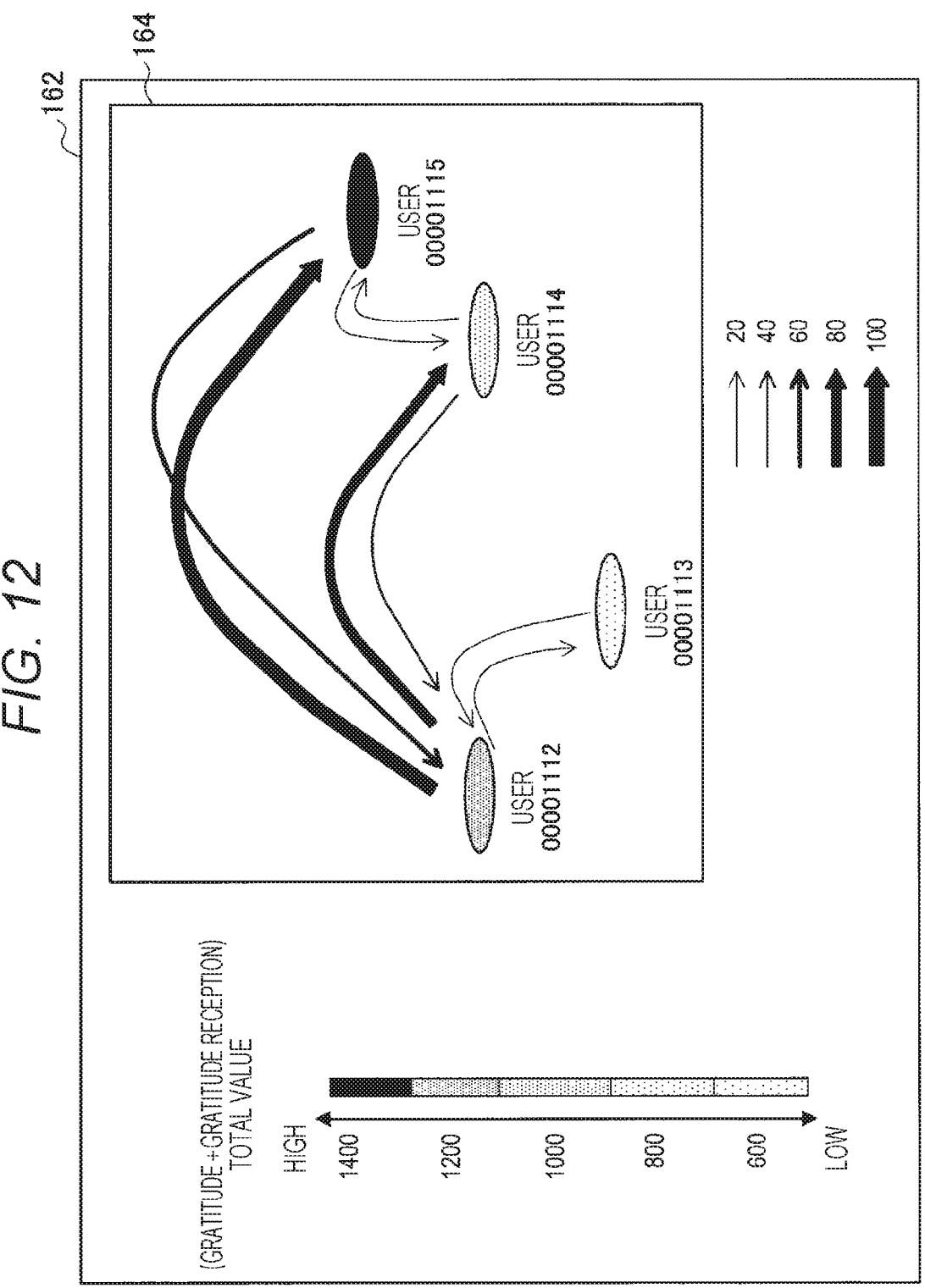
FIG. 12 is an exemplary visualized graph according to the present embodiment.

Here, FIG. 12 illustrates an exemplary visualized graph created according to the present embodiment. A visualized image 162 illustrated in FIG. 12 includes a visualized graph 164. On the visualized graph 164, islands colored on the basis of the respective pieces of status data of the users (here, the total value of gratitude currency and gratitude reception currency) are connected by arrows each corresponding to the amount of gratitude act among the users. This allows intuitively understanding of the degree of gratitude act by whom to whom and the amount of gratitude currency and gratitude reception currency owned by whom. Note that the degree of amount of gratitude may be represented by moving of the pattern of the arrow quickly with animation.

Note that in a case where publishing of personal data as it is has a disadvantage or the granularity of personal data is better to change, there can also be created a visualized graph in a similar manner with abstracted layers from the individual level, to visualize the status of each organization, company, region, or the like. Here, FIG. 13 illustrates an exemplary visualized graph for each entity. As illustrated in FIG. 13, each island included in the visualized graph 166 is colored, for example, in accordance with the total value of gratitude currency and gratitude reception currency of all users belonging to an entity (e.g., each town). Furthermore, arrows making connection between each island are expressed, on the basis of the amount of gratitude act from the users belonging to one entity from the users belonging to the other entity. Thus, the present embodiment allows creation of a visualized graph other than for individual person.

Furthermore, recording places of gratitude act as transaction data to create similarly a visualized graph for each place makes it possible to grasp the degree of gratitude and gratitude reception depending on the place.

Furthermore, similarly creating a visualized graph for each time zone or each day of the week also allows grasp of what kind of time zone or day of the week has more gratitude and gratitude reception.

Moreover, creating a visualized graph on the basis of point exchange (usage in a store) of gratitude currency and gratitude reception currency allows intuitive grasp of the degree of market activity. The creation processing on a visualized graph on the basis of the point exchange will be described later with reference to FIGS. 14 to 16.

The creation of visualization described above designates exemplarily a region and a date; however, the present embodiment is not limited to such a region and a date. In a case where a different visualization has been requested from the terminal device 1 (step S348/No), the visualization unit 203 performs different visualization processing in response to the request (step S372).

(Visualization of Point Exchange)

Figure 14:
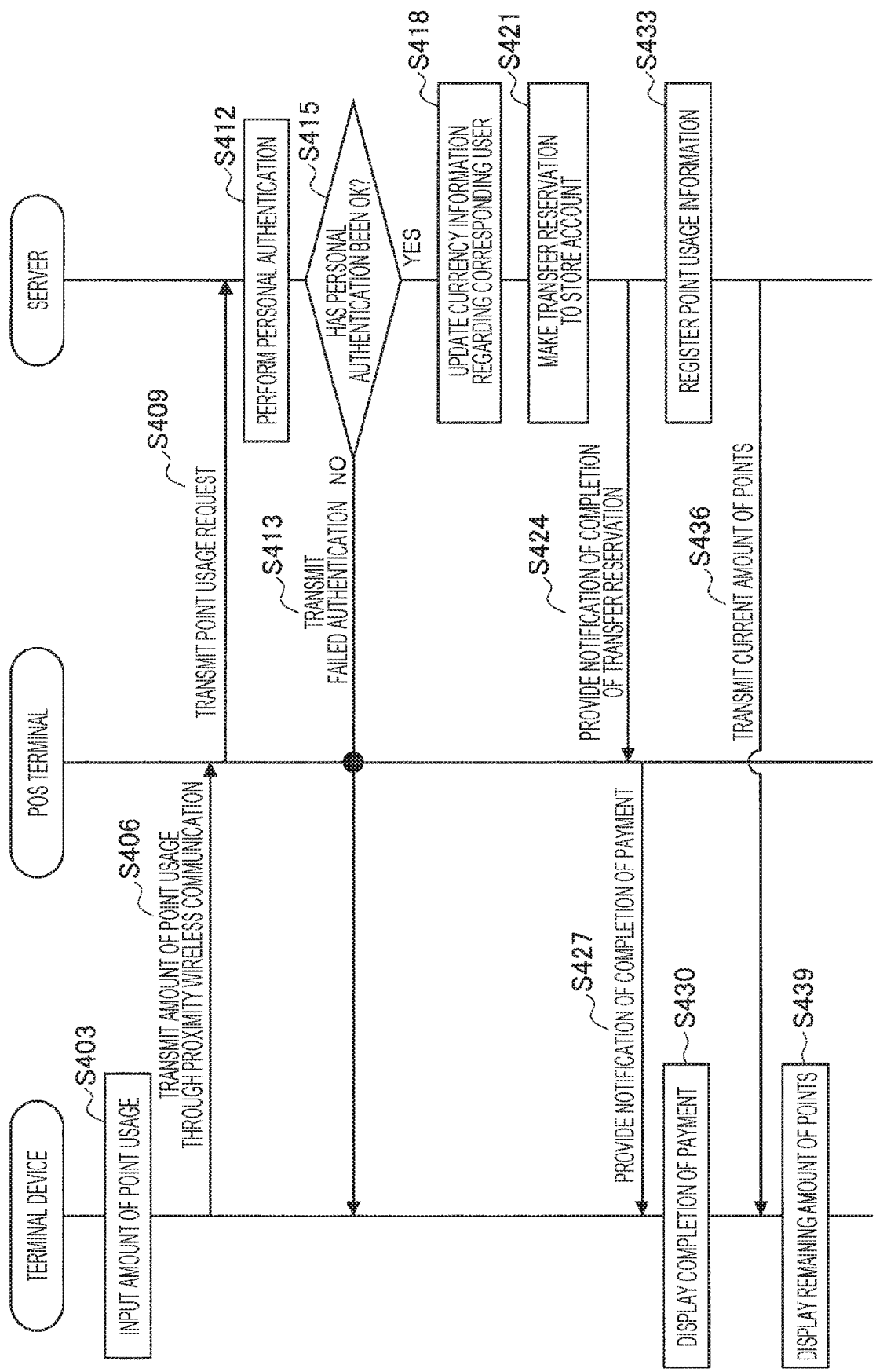
FIG. 14 is a sequence diagram of operation processing in usage of gratitude currency and gratitude reception currency as points according to the present embodiment.

Subsequently, visualization processing on the basis of information regarding usage of gratitude currency and gratitude reception currency as points will be described with reference to FIGS. 14 to 16.

First, with reference to FIG. 14, operation processing in usage of the gratitude currency and the gratitude reception currency as points will be described. As illustrated in FIG. 14, first, the user inputs the amount of point usage with the terminal device 1 (step S403).

Next, the user holds the terminal device 1 over a reading device of the POS terminal 4, and information regarding the amount of point usage is transmitted from the terminal device 1 to the POS terminal 4, through the proximity wireless communication (step S406).

Next, the POS terminal 4 transmits a point usage request acquired from the terminal device 1, to the server 2 (step S409). At this time, the point usage request may include a user ID.

Next, the server 2 performs personal authentication on the basis of the user ID (step S412).

Next, in a case where personal authentication has failed (step S415/No), the server 2 notifies the POS terminal 4 of the failed authentication, and also notifies the terminal device 1 via the POS terminal 4 (step S413).

On the other hand, in a case where personal authentication has succeeded (step S415/Yes), the currency management unit 201 of the server 2 updates currency information regarding the corresponding user (step S418). Specifically, the number of points to be used this time is subtracted from the amount of gratitude currency and gratitude reception currency of the user (i.e., the number of points) stored in the user history storage unit 24.

Subsequently, the server 2 makes a transfer reservation for the corresponding sum of money to an account of a store, as payment processing on the point usage to the store (step S421), and notifies the POS terminal 4 of completion of the transfer reservation (step S424).

Next, a payment completion notice is transmitted from the POS terminal 4 to the terminal device 1 (step S427), and a payment completion display is displayed on the display unit 16 of the terminal device 1 (step S430).

Then, the server 2 registers the point usage information regarding the user into the point usage information storage unit 23 (step S433). As indicated in Table 3 below, the point usage information includes, for example, the items of number of POS terminal 4, time stamp, exchange (usage) point, and user ID.

TABLE 3

| POS number | Time stamp | Exchanged point | User ID |
|---|---|---|---|
| ... | ... | ... | ... |
| P00001101 | 2016 Nov. 21 13:59:17 | 1000P Used gratitude reception currency | 00001113 (Person B) |
| P00001102 | 2016 Nov. 25 18:50:01 | 2000P Used gratitude currency | 00001114 (Person C) |
| ... | | ... | ... |

Next, the server 2 transmits the current amount of points (the current status of the gratitude currency and the gratitude reception currency) to the terminal device 1 via the network (step S436), and the terminal device 1 displays the remaining amount of points to notify the user (step S439).

As described above, usage of gratitude currency and gratitude reception currency with a POS terminal in a store or the like results in accumulation of point usage information in the server 2. The server 2 allows generation of a visualized image, on the basis of the point usage information accumulated in such a manner. Subsequently, visualization processing on point exchange according to the present embodiment will be described with reference to FIG. 15.

Figure 15:
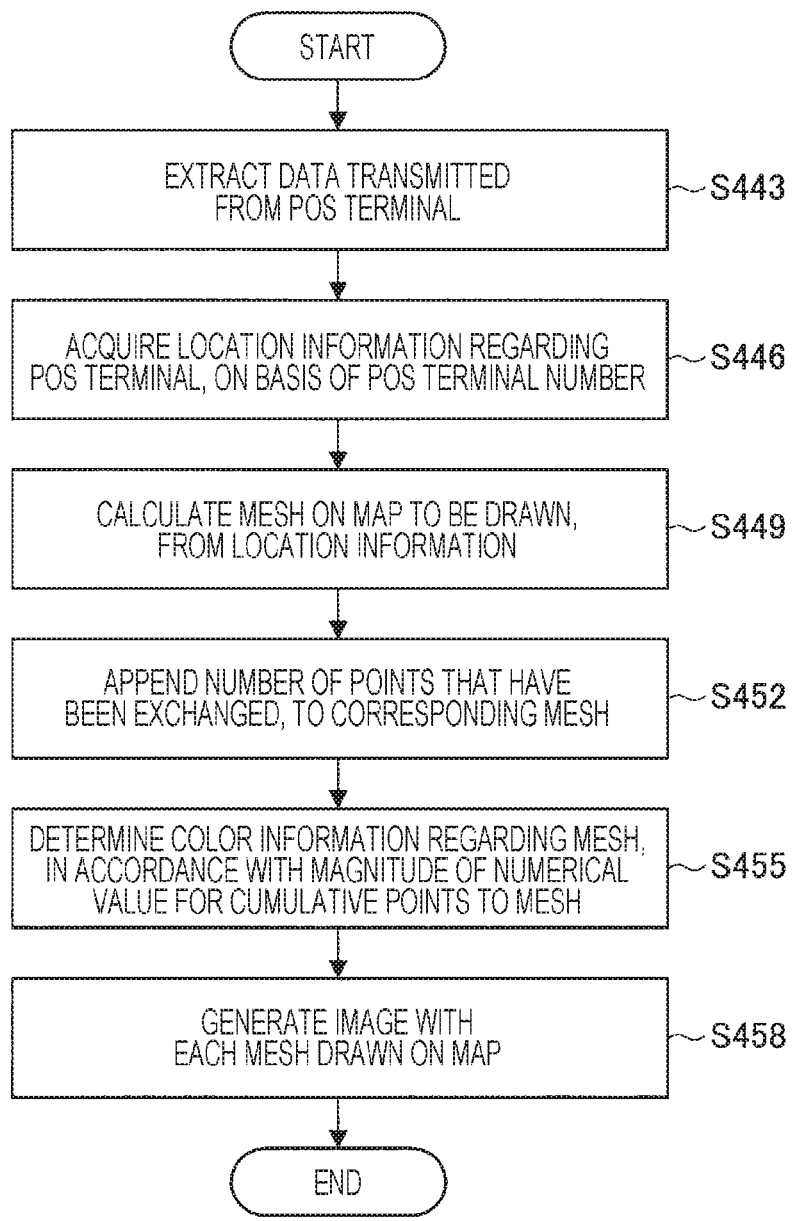
FIG. 15 is a flowchart of visualization processing on the status of point exchange according to the present embodiment.

FIG. 15 is a flowchart of visualization processing on the status of point exchange according to the present embodiment. As illustrated in FIG. 15, first, the visualization unit 203 of the server 2 extracts data (accumulated point usage information) transmitted from each POS terminal, from the point usage information storage unit 23 (step S443).

Next, the visualization unit 203 acquires location information regarding a POS terminal 4 with which a point has been used, on the basis of each POS terminal number included in the point usage information (step S446). The server 2 has installation store information regarding each POS terminal, and can acquire location information regarding the installation place on the basis of the POS number.

Next, the visualization unit 203 calculates a mesh on a map to be drawn, from the location information (step S449), and appends the number of points that have been exchanged, to the corresponding mesh (step S452).

Next, the visualization unit 203 determines color information regarding the mesh, in accordance with the magnitude of numerical value for cumulative points to the mesh (step S455), and generates a visualized image 170 (see FIG. 16) with each mesh drawn on the map (step S458).

Figure 16:
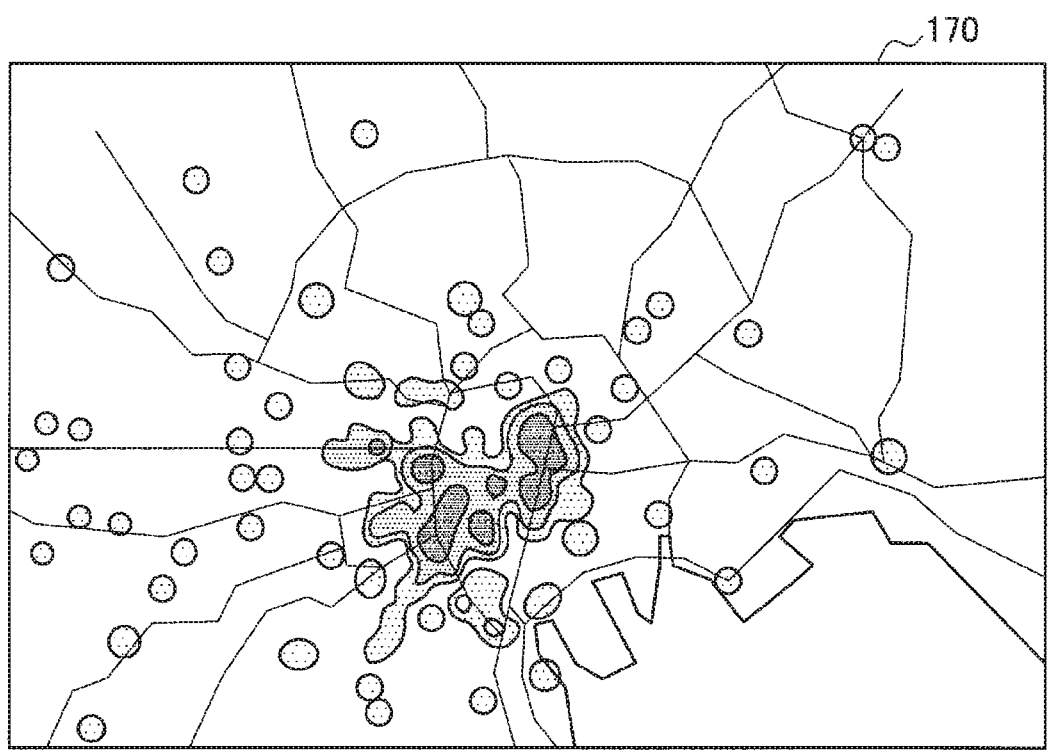
FIG. 16 is an exemplary visualized image of the status of point exchange according to the present embodiment.

As illustrated in FIG. 16, the cumulation of the number of points that have been used is colored on the map, thereby allowing real time grasp of where and how much "gratitude currency" and "gratitude reception currency" have been used as points. Note that, in visualization of point usage, there can be performed temporal and local designation for point usage information to be visualized.

«5. Applied Example»

Subsequently, an applied example of the present embodiment will be described. The terminal device 1 generates gratitude currency and gratitude reception currency in the present embodiment described above; however, the present embodiment is not limited to the terminal device 1, and gratitude currency and gratitude reception currency can be generated on the server 2 side. There will be described below operation processing for recognition of a gratitude act and generation of gratitude currency and gratitude reception currency, or the like on the server 2 side, with reference to FIGS. 17 to 18. Here, there will be sequentially described operation processing of the terminal device 1A of the user A (terminal device on the gratitude act side) and the server 2, and operation processing of the terminal device 1B of the user B (terminal device on the gratitude reception side) and the server 2, for a gratitude act from the user A to the user B, for example.

Figure 17:
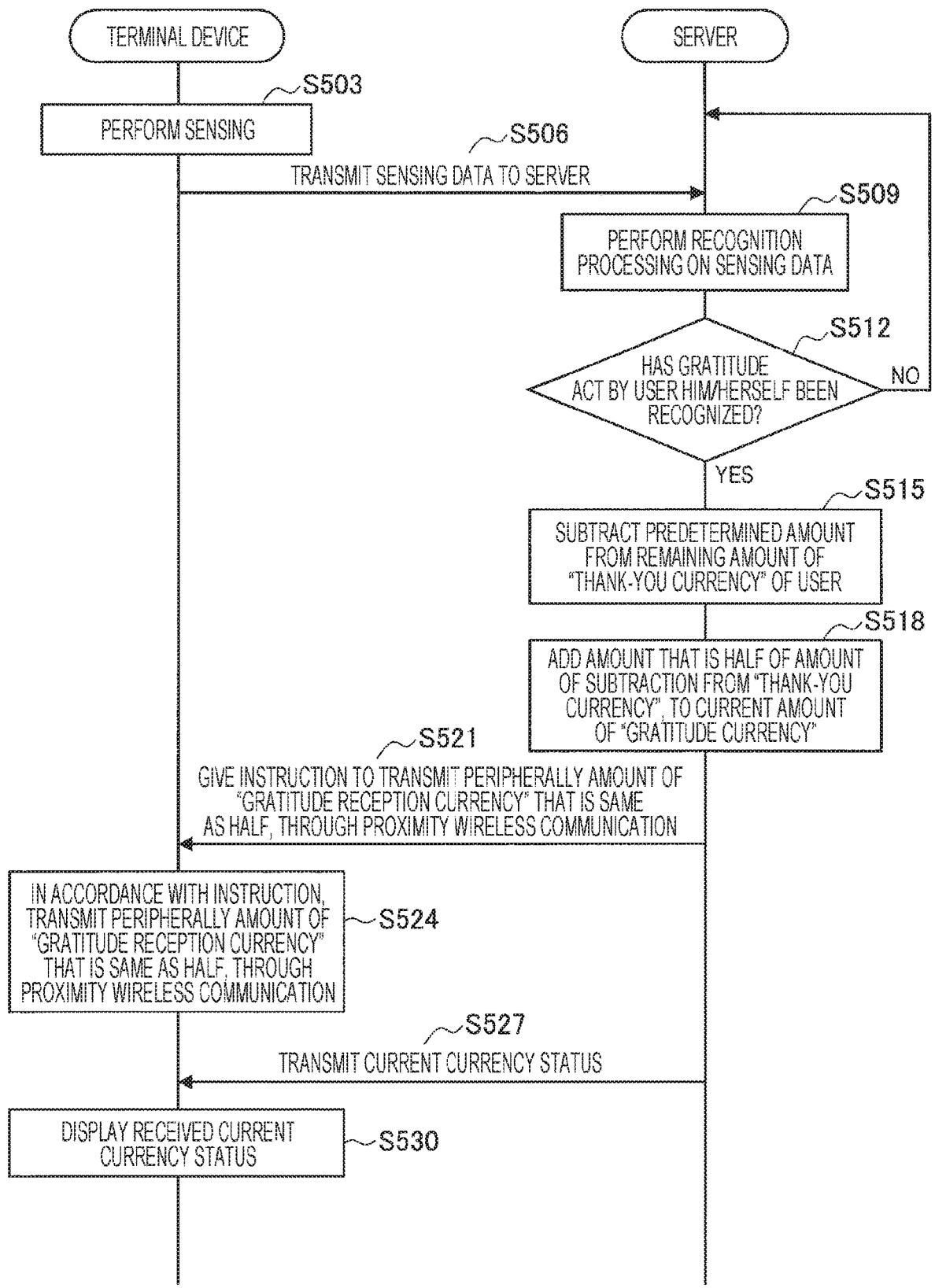
FIG. 17 is a sequence diagram of operation processing of the terminal device on the gratitude act side and the server according to an applied example.

FIG. 17 is a sequence diagram of operation processing of the terminal device 1 on the gratitude act side and the server 2 according to the applied example. As illustrated in FIG. 17, the terminal device 1 senses peripheral voices and user acts with the voice input unit 14 or the sensor 15 (step S503), and transmits the sensing data (e.g., voice data) to the server 2 (step S506).

Next, the gratitude act recognition unit 204 of the server 2 performs recognition processing on the sensing data (step S509), and recognizes a gratitude act by the user him/herself (step S512). Specifically, the gratitude act recognition unit 204 recognizes an utterance of "thank you" with voice recognition and further verifies whether or not the voice is the user's voice, with voiceprint analysis, for example.

Next, in a case where a gratitude act by the user him/herself has been recognized (step S512/Yes), the currency management unit 201 of the server 2 subtracts a predetermined amount from the remaining amount of "thank-you currency" of the user (step S515).

Next, the currency management unit 201 adds the amount that is half of the amount of subtraction from the "thank-you currency", to the current amount of "gratitude currency" of the same user (step S518), and instructs the terminal device 1 to transmit peripherally the amount of "gratitude reception currency" that is the same as the half, through the proximity wireless communication (step S521).

Next, in accordance with the instruction, the terminal device 1 transmits peripherally the amount of "gratitude reception currency" that is the same as the half, through the proximity wireless communication (step S524).

Next, in a case where the server 2 has transmitted the current currency status of the user to the terminal device 1 (step S527), the terminal device 1 displays the current status of passage to notify the user (step S530).

Figure 18:
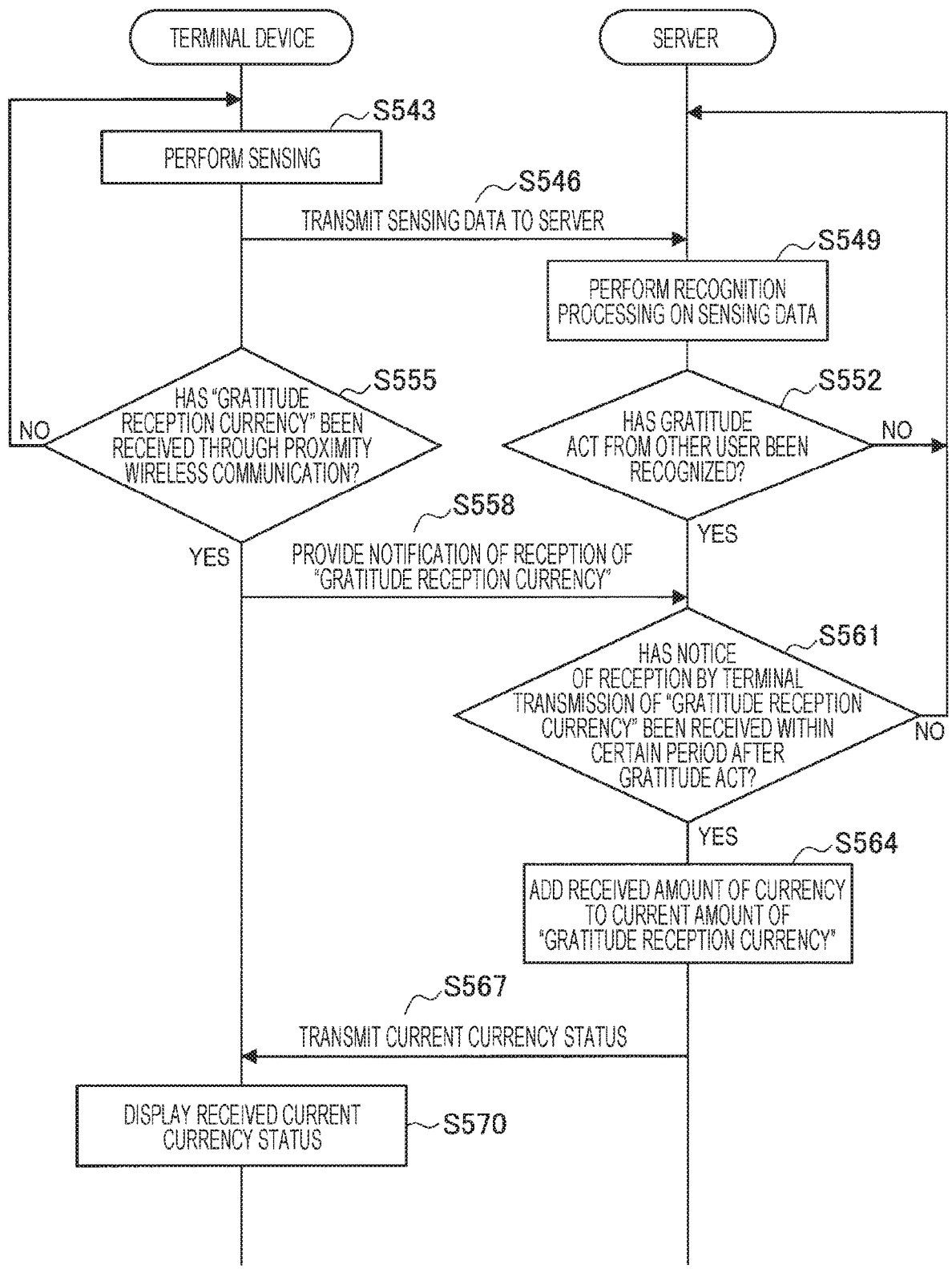
FIG. 18 is a sequence diagram of operation processing of the terminal device on the gratitude reception side and the server according to the applied example.

FIG. 18 is a sequence diagram of operation processing of the terminal device on the gratitude reception side and the server according to the applied example. As illustrated in FIG. 18, the terminal device 1 senses peripheral voices and user acts with the voice input unit 14 or the sensor 15 (step S543), and transmits the sensing data (e.g., voice data) to the server 2 (step S546).

Next, the gratitude act recognition unit 204 of the server 2 performs recognition processing on the sensing data (step S549), and recognizes a gratitude act from the other user (step S552). Specifically, the gratitude act recognition unit 204 recognizes an utterance of "thank you" with voice recognition and further verifies whether or not the voice is a person's voice other than the user, with voiceprint analysis, for example.

Next, in a case where the terminal device 1 has received "gratitude reception currency" from a peripheral terminal device through the proximity wireless communication (step S555/Yes), the terminal device 1 notifies the server 2 of the reception of the "gratitude reception currency" (step S558).

Next, in a case where the server 2 has recognized a gratitude act from the other user (step S552/Yes) and further received a notice of the reception by the terminal device 1 of the "gratitude reception currency", within a certain period of time after the recognition of the gratitude act (step S561/Yes), the server 2 adds the received amount of currency to the current amount of "gratitude reception currency" of the user (step S564).

Next, in case where the server 2 has transmitted the current currency status of the user to the terminal device 1 (step S564), the terminal device 1 displays the current status of passage to notify the user (step S570).

«6. Conclusion»

As described above, the information processing system according to the embodiment of the present disclosure makes it possible to distribute, to both parties, virtual currency that generates value through a gratitude act.

The preferred embodiment of the present disclosure has been described above in detail with reference to the accompanying drawings; however, the present technology is not limited to such examples. It is obvious that persons having ordinary knowledge in the technical field of the present disclosure can conceive various alternation examples or modification examples within the scope of the technical idea described in the claims, and it is naturally understood that such alternation examples or modification examples belong to the technical scope of the present disclosure.

For example, there can be created a computer program for causing the hardware such as the CPU, ROM, and RAM built in the terminal device 1 or the server 2 described above to exhibit the functions of the terminal device 1 or the server 2. Furthermore, there is also provided a computer readable storage medium storing the computer program.

Furthermore, the effects described in the present specification are merely explanatory or exemplary, and are not limiting. That is, the technology according to the present disclosure can exhibit other effects obvious to those skilled in the art from the description of the present specification, together with or instead of the above effects.

Note that the present technology can also take the following configurations.

(1)

A client device including:
a detection unit configured to detect an act of expressing gratitude by a user;
a communication unit configured to transmit and receive at least a first portion of virtual currency; and
a control unit configured to perform control, with recognition of an act of expressing gratitude by a first user on the basis of data detected by the detection unit, such that a certain amount corresponding to the act in virtual currency held by the first user is subtracted and a first portion of the certain amount of the virtual currency is managed as gratitude currency held by the first user, the control unit being configured to cause the communication unit to transmit peripherally a second portion of the certain amount of the virtual currency, as information regarding gratitude reception currency, the control unit being configured to perform control, with reception of information regarding gratitude reception currency via the communication unit after detection of an act of expressing gratitude by a second user on the basis of data detected by the detection unit, such that the gratitude reception currency indicated by the information regarding the gratitude reception currency is managed as gratitude reception currency held by the first user.

(2)

The client device according to (1) described above,
in which the control unit performs control, with detection of the act of expressing gratitude by the first user on the basis of the data detected by the detection unit,
such that the certain amount corresponding to the act in the virtual currency held by the first user is subtracted and the first portion of the certain amount of the virtual currency is managed as the gratitude currency held by the first user, and
the control unit causes the communication unit to transmit peripherally information regarding gratitude reception currency indicating an amount of gratitude reception currency obtained by dividing of the second portion of the certain amount of the virtual currency, by an estimation number of client devices in a periphery of the client device.

(3)

The client device according to (1) or (2) described above, further including:
a storage unit configured to store an amount of each of the pieces of currency held by the first user;
an additional communication unit configured to upload, to a server, the respective amounts of the virtual currency, the gratitude currency, and the gratitude reception currency held by the first user, in association with the first user; and
a display unit configured to display visualized data of visualized information regarding the pieces of currency generated by the server,
in which, the control unit performs control to transmit, in accordance with a visualization request from the user, the visualization request to the server via the additional communication unit, and control to display the visualized data generated and transmitted by the server in response to the visualization request on the display unit.

(4)

The client device according to any one of (1) to (3) described above,
in which the control unit changes the amount of the gratitude currency and the amount of gratitude reception currency, in accordance with details of the detected act of expressing gratitude.

(5)

An information processing system, including:
a storage unit configured to store an amount of currency held by a user, on a per-user basis;
a communication unit configured to receive information based on data detected by a detection unit that detects an act of expressing gratitude by the user and information regarding the currency, together with a user ID; and
a control unit configured to control the storage unit so as to manage a first portion of a certain amount of virtual currency as gratitude currency held by a first user, with subtraction of the certain amount corresponding to an act in the virtual currency held by the first user after recognition of the act of expressing gratitude by the first user corresponding to a first user ID, according to the information based on the data detected by the detection unit, received together with the first user ID, the control unit being configured to perform control to transmit, via the communication unit, an instruction signal for instructing a client device to peripherally transmit a second portion of the certain amount of the virtual currency as information regarding gratitude reception currency, the control unit being configured to further control the storage unit so as to manage for gratitude reception currency held by the first user, with reception of a notice indicating acquisition by the first user of a predetermined amount of gratitude reception currency, together with the first user ID from the communication unit, subsequently to recognition of an act of expressing gratitude by a second user not corresponding to the first user ID according to the information based on the data detected by the detection unit, received together with the first user ID.

(6)

The information processing system according to (5) described above, in which the control unit causes the storage unit to store transaction of gratitude currency and gratitude reception currency received via the communication unit, in association with a date and time, and the control unit performs control, with reception of a visualization request that requests for visualizing the transaction via the communication unit, such that, in accordance with information regarding the transaction of currency stored in the storage unit, an image in which a direction of gratitude between each user and an amount of the gratitude are visualized is generated and a reply is made with the resultant image via the communication unit.

(7)

The information processing system according to (6) described above, in which the visualization request includes designation of a specific attribute to which the user belongs and a date and time of the transaction.

(8)

The information processing system according to any one of (5) to (7) described above, in which the gratitude currency and the gratitude reception currency are each usable as a point instead of actual currency, and via the communication unit, with detection of usage of the gratitude currency or the gratitude reception currency as the point by a specific user in a specific store, the control unit authenticates the specific user, and performs, in accordance with a result of the authentication, processing of a transfer reservation for sum of money corresponding to the usage point, to an account of the specific store.

(9)

The information processing system according to (8) described above, in which the control unit causes the storage unit to store information, received via the communication unit, indicating the usage of the gratitude currency or the gratitude reception currency as the point at the store, in association with a store ID and a date and time, and the control unit performs control, with reception of a visualization request that requests for visualizing the point usage via the communication unit, such that in accordance with the information for the point usage stored in the storage unit, an image in which an amount of points used every place correlated to each store on a map is visualized is generated and a reply is made with the resultant image via the communication unit.

(10)

A computer-readable storage medium storing a program for causing the computer to function as:

a detection unit configured to detect an act of expressing gratitude by a user;

a communication unit configured to transmit and receive at least a first portion of virtual currency; and a control unit configured to perform control, with recognition of an act of expressing gratitude by a first user on the basis of data detected by the detection unit, such that a certain amount corresponding to the act in virtual currency held by the first user is subtracted and a first portion of the certain amount of the virtual currency is managed as gratitude currency held by the first user, the control unit being configured to cause the communication unit to transmit peripherally a second portion of the certain amount of the virtual currency, as information regarding gratitude reception currency, the control unit being configured to perform control, with reception of information regarding gratitude reception currency via the communication unit after detection of an act of expressing gratitude by a second user on the basis of data detected by the detection unit, such that the gratitude reception currency indicated by the information regarding the gratitude reception currency is managed as gratitude reception currency held by the first user.

(11)

An information processing method with a processor, including:

storing an amount of currency held by a user, on a per-user basis, in a storage unit;

receiving information based on data detected by a detection unit that detects an act of expressing gratitude by the user and information regarding the currency, together with a user ID, with a communication unit; and controlling the storage unit so as to manage a first portion of a certain amount of virtual currency as gratitude currency held by a first user, with subtraction of the certain amount corresponding to an act in the virtual currency held by the first user after recognition of the act of expressing gratitude by the first user corresponding to a first user ID, according to the information based on the data detected by the detection unit, received together with the first user ID, and performing control to transmit, via the communication unit, an instruction signal for instructing a client device to peripherally transmit a second portion of the certain amount of the virtual currency as information regarding gratitude reception currency; and further controlling the storage unit so as to manage for gratitude reception currency held by the first user, with reception of a notice indicating acquisition by the first user of a predetermined amount of gratitude reception currency, together with the first user ID from the communication unit, subsequently to recognition of an act of expressing gratitude by a second user not corresponding to the first user ID according to the information based on the data detected by the detection unit, received together with the first user ID.

REFERENCE SIGNS LIST

1 Terminal device
10 Control unit
11 Network communication unit
12 Proximity wireless communication unit
13 Operation input unit
14 Voice input unit
15 Sensor
16 Display unit
17 Voice output unit 18 Currency information storage unit
2 Server
20 Control unit
21 Communication unit
22 Currency issuance information storage unit
23 Point usage information storage unit
24 User history storage unit

The invention claimed is:

1. A first client device, comprising:
a detection unit configured to detect an act of expressing gratitude by one of a first or a second user;
a first communication unit configured to at least one of transmit or receive virtual currency;
a control unit configured to:
  detect intensity of each of a plurality of proximity wireless communication signals emitted from a plurality of second client devices in a periphery of the first client device;
  select a set of client devices from the plurality of second client devices based on the detected intensity;
  subtract, with the detection of the act of expressing gratitude by the first user, a certain amount of the virtual currency held by the first user;
  manage a first portion of the certain amount of the virtual currency as gratitude currency held by the first user;
  cause the first communication unit to transmit peripherally an amount of a second portion of the certain amount of the virtual currency as gratitude reception currency, based on the detection of the act of expressing gratitude by the first user, wherein the amount of the gratitude reception currency is obtained by division of the second portion of the certain amount of the virtual currency by a number of client devices in the selected set of client devices; and
  receive, with reception of information regarding the gratitude reception currency via the first communication unit after detection of the act of expressing gratitude by the second user, the gratitude reception currency from a client device associated with the second user; and
a display unit configured to display visualized data including the virtual currency held by the first user, the gratitude currency held by the first user, and the gratitude reception currency held by the first user.

2. The first client device according to claim 1, further comprising:
a storage unit configured to store an amount of the virtual currency, an amount of the gratitude currency, and an amount of the gratitude reception currency held by the first user; and
a second communication unit configured to upload, to a server, respective amounts of the virtual currency, the gratitude currency, and the gratitude reception currency held by the first user, in association with the first user, wherein the control unit is further configured to:
  receive a visualization request from the first user,
  control transmission of the visualization request to the server via the second communication unit,
  receive the visualized data generated by the server, and
  control display of the visualized data on the display unit in response to the visualization request.

3. The first client device according to claim 1, wherein the control unit is further configured to change an amount of the gratitude currency and an amount of the gratitude reception currency, based on details of the detected act of expressing gratitude.

4. An information processing system, comprising:
a storage unit configured to store an amount of virtual currency held by at least one of a first user or a second user, on a per-user basis;
a detection unit configured to detect an act of expressing gratitude by one of the first user or the second user;
a communication unit configured to:
  receive first information based on the detection of the act of expressing gratitude by the first user; and
  receive second information regarding the virtual currency, together with a first user identification (ID) associated with the first user; and
a control unit configured to:
  receive information associated with intensity of each of a plurality of proximity wireless communication signals emitted from a plurality of first client devices in a periphery of a second client device;
  select a set of client devices from the plurality of first client devices based on the received information associated with the intensity;
  subtract a certain amount from the virtual currency based on the detection of the act of expressing gratitude by the first user;
  control the storage unit to manage a first portion of the certain amount of the virtual currency as gratitude currency held by the first user corresponding to the first user ID, based on the received first information;
  transmit, via the communication unit, an instruction signal for instructing the second client device to peripherally transmit an amount of a second portion of the certain amount of the virtual currency as gratitude reception currency based on the received first information, wherein the amount of the gratitude reception currency is obtained by division of the second portion of the certain amount of the virtual currency by a number of client devices in the selected set of client devices;
  control the storage unit to manage the gratitude reception currency held by the first user, based on reception of a notice indicating acquisition of a predetermined amount of the gratitude reception currency by the first user, together with the first user ID from the communication unit, subsequent to the detection of the act of expressing gratitude by the second user not corresponding to the first user ID based on the received first information; and
  generate visualized data comprising the virtual currency held by the first user, the gratitude currency held by the first user and the gratitude reception currency held by the first user; and
a display unit configured to display the visualized data.

5. The information processing system according to claim 4, wherein the control unit is further configured to:
cause the storage unit to store a transaction of at least one of the gratitude currency or the gratitude reception currency, received via the communication unit, in association with a date and a time associated with the transaction;
generate, with reception of a visualization request indicating a request for visualizing the transaction of the gratitude currency and the gratitude reception currency via the communication unit, an image comprising a direction of expressing the gratitude between the first user and the second user, an amount of the gratitude currency and an amount of the gratitude reception currency corresponding to the act of expressing gratitude; and generate a reply with the image via the communication unit.

6. The information processing system according to claim 5, wherein the visualization request includes a designation of a specific attribute to which the at least one of the first user or the second user belongs along with a date and a time of the transaction.

7. The information processing system according to claim 4, wherein each of the gratitude currency and the gratitude reception currency corresponds to usable points instead of actual currency, and based on detection of usage of at least one of the gratitude currency or the gratitude reception currency as the usable points by one the first user or the second user in a specific store via the communication unit, the control unit is further configured to:

authenticate one of the first user or the second user; and process, in accordance with a result of the authentication, a transfer reservation for a sum of money corresponding to the usable points, to an account of the specific store.

8. The information processing system according to claim 7, wherein the control unit is further configured to:

cause the storage unit to store information, received via the communication unit, indicating the usage of at least one of the gratitude currency or the gratitude reception currency as the usable points at the specific store, in association with a store ID and a date and a time of the usage of one of the gratitude currency or the gratitude reception currency as the usable points;

generate, with reception of a visualization request indicating a request for visualizing the usage of the gratitude currency or the gratitude reception currency as the usable points via the communication unit, an image comprising an amount of the usable points used at every place correlated to each store on a map; and generate a reply with the image via the communication unit.

9. A non-transitory computer-readable medium stored thereon computer-executable instructions which, when executed by a processor, cause the processor to execute operations, the operations comprising:

detecting, via a detection unit, an act of expressing gratitude by one of a first user or a second user;

at least one of transmitting or receiving virtual currency via a communication unit;

detecting, via a control unit, intensity of each of a plurality of proximity wireless communication signals emitted from a plurality of first client devices in a periphery of a second client device;

selecting, via the control unit, a set of client devices from the plurality of first client devices based on the detected intensity;

subtracting, via the control unit, a certain amount of the virtual currency held by the first user, based on the detection of the act of expressing gratitude by the first user;

managing, via the control unit, a first portion of the certain amount of the virtual currency as gratitude currency held by the first user;

transmitting, via the communication unit, peripherally an amount of a second portion of the certain amount of the virtual currency as gratitude reception currency, based on the detection of the act of expressing gratitude by the first user, wherein the amount of the gratitude reception currency is obtained by division of the second portion of the certain amount of the virtual currency by a number of client devices in the selected set of client devices;

receiving, with reception of information regarding the gratitude reception currency via the communication unit after detection of the act of expressing gratitude by the second user, the gratitude reception currency from a client device associated with the second user; and displaying, via a display unit, visualized data including the virtual currency held with the first user, the gratitude currency held by the first user, and the gratitude reception currency held by the first user.

10. An information processing method, by a processor, comprising:

storing an amount of virtual currency held by at least one of a first user or a second user, on a per-user basis, in a storage unit;

detecting, via a detection unit, an act of expressing gratitude by one of the first user or the second user;

receiving, via a communication unit, first information based on the detection of the act of expressing gratitude by the first user;

receiving, via the communication unit, second information regarding the virtual currency, together with a user identification (ID) associated with the first user;

receiving, via the communication unit, information associated with intensity of each of a plurality of proximity wireless communication signals emitted from a plurality of first client devices in a periphery of a second client device;

selecting, via a control unit, a set of client devices from the plurality of first client devices based on the received information associated with the intensity;

subtracting, via the control unit, a certain amount from the virtual currency based on the detection of the act of expressing gratitude by the first user;

controlling, via the control unit, the storage unit to manage a first portion of the certain amount of the virtual currency as gratitude currency held by the first user corresponding to the user ID, based on the received first information;

transmitting, via the communication unit, an instruction signal for instructing the second client device to peripherally transmit an amount of a second portion of the certain amount of the virtual currency as gratitude reception currency based on the received first information, wherein the amount of the gratitude reception currency is obtained by division of the second portion of the certain amount of the virtual currency by a number of client devices in the selected set of client devices;

controlling, via the control unit, the storage unit to manage the gratitude reception currency held by the first user, based on reception of a notice indicating acquisition of a predetermined amount of the gratitude reception currency by the first user, together with the user ID from the communication unit, subsequent to the detection of the act of expressing gratitude by the second user not corresponding to the user ID based on the received first information;

generating, via the control unit, visualized data comprising the virtual currency held by the first user, the gratitude currency held by the first user and the gratitude reception currency held by the first user; and displaying, via a display unit, the visualized data.

* * * * *